(12) United States Patent
Tie et al.

(10) Patent No.: US 12,323,956 B2
(45) Date of Patent: *Jun. 3, 2025

(54) COMMUNICATION METHOD AND COMMUNICATIONS APPARATUS

(71) Applicant: HUAWEI TECHNOLOGIES CO., LTD., Shenzhen (CN)

(72) Inventors: Xiaolei Tie, Shanghai (CN); Jun Li, Shanghai (CN); Zhe Jin, Beijing (CN); Yan Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,795

(22) Filed: Mar. 29, 2024

(65) Prior Publication Data

US 2024/0334403 A1 Oct. 3, 2024

Related U.S. Application Data

(63) Continuation of application No. 17/171,797, filed on Feb. 9, 2021, now Pat. No. 11,963,143, which is a
(Continued)

(30) Foreign Application Priority Data

Aug. 10, 2018 (CN) .......................... 201810912282.0
Jul. 16, 2019 (CN) .......................... 201910642735.7

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC .. H04W 72/231; H04W 74/008; H04L 5/001; H04L 5/0053; H04L 27/26025; H04L 5/0048

See application file for complete search history.

(56) References Cited

U.S. PATENT DOCUMENTS

2019/0260510 A1 8/2019 Lin
2019/0357178 A1 11/2019 Bea et al.
2020/0288453 A1* 9/2020 Zhang ................... H04W 72/12

FOREIGN PATENT DOCUMENTS

CN 106455103 A 2/2017
CN 107027179 A 8/2017
(Continued)

OTHER PUBLICATIONS

Intel Corporation, "On Overlap of Multiple D2D Resource Pools and UE Behavior," 3GPP TSG RAN WG1 Meeting #79, San Francisco, USA, R1-144652, total 6 pages, 3rd Generation Partnership Project, Valbonne, France (Nov. 17-21, 2014).
(Continued)

*Primary Examiner* — Iqbal Zaidi
(74) *Attorney, Agent, or Firm* — Leydig, Voit & Mayer, Ltd.

(57) ABSTRACT

This application provides a communication method and a communications apparatus, where the communication method includes: receiving, by a terminal device, downlink control information, where the downlink control information is used to indicate the terminal device to receive or send a first channel on a first resource; receiving, by the terminal device, first indication information, where the first indication information is used to indicate a second resource; when the first resource and the second resource overlap in time domain, receiving or sending, by the terminal device, the
(Continued)

first channel on a third resource, where the third resource and the second resource do not overlap in time domain.

20 Claims, 11 Drawing Sheets

Related U.S. Application Data continuation of application No. PCT/CN2019/099898, filed on Aug. 9, 2019.

(56) References Cited

FOREIGN PATENT DOCUMENTS

| | | |
|---|---|---|
| CN | 108271162 A | 7/2018 |
| CN | 108282286 A | 7/2018 |
| EP | 3506698 A1 | 7/2019 |
| EP | 3528563 A1 | 8/2019 |
| WO | 2009088169 A1 | 7/2009 |
| WO | 2018082043 A1 | 5/2018 |
| WO | 2018090259 A1 | 5/2018 |
| WO | 2018128356 A1 | 7/2018 |

OTHER PUBLICATIONS

Institute for Information Industry (III), "Intra-UE UL multiplexing with different reliability requirements," 3GPP TSG RAN WG1 Meeting #93, Busan, Korea, R1-1807140, total 4 pages, 3rd Generation Partnership Project, Valbonne, France (May 21-25, 2018).

"3rd Generation Partnership Project;Technical Specification Group Radio Access Network;Evolved Universal Terrestrial Radio Access (E-UTRA);Requirements for support of radio resource management(Release 15)," 3GPP TS 36.133 V15.3.0, total 3128 pages, 3rd Generation partnership Project, Valbonne, France (Jun. 2018).

Ericsson, "Summary of Overlapped PUCCH Resources," 3GPP TSG RAN WG1 Meeting #93, Busan, South Korea, R1-1807662, total 21 pages, 3rd Generation Partnership Project, Valbonne, France (May 21-25, 2018).

"3rd Generation Partnership Project;Technical Specification Group Radio Access Network;Evolved Universal Terrestrial Radio Access (E-UTRA);Physical channels and modulation(Release 15)," 3GPP TS 36.211 V15.2.0, total 236 pages, 3rd Generation partnership Project, Valbonne, France (Jun. 2018).

"3rd Generation Partnership Project;Technical Specification Group Radio Access Network;Evolved Universal Terrestrial Radio Access (E-UTRA);Multiplexing and channel coding(Release 15)," 3GPP TS 36.212 V15.2.1, total 246 pages, 3rd Generation partnership Project, Valbonne, France (Jul. 2018).

"3rd Generation Partnership Project;Technical Specification Group Radio Access Network;Evolved Universal Terrestrial Radio Access (E-UTRA);Physical layer procedures(Release 15)," 3GPP TS 36.213 V15.2.0, total 541 pages, 3rd Generation partnership Project, Valbonne, France (Jun. 2018).

"3rd Generation Partnership Project;Technical Specification Group Radio Access Network;Evolved Universal Terrestrial Radio Access (E-UTRA);Radio Resource Control (RRC);Protocol specification(Release 15)," 3GPP TS 36.331 V15.2.2, total 791 pages, 3rd Generation partnership Project, Valbonne, France (Jun. 2018).

U.S. Appl. No. 17/171,797, filed Feb. 9, 2021, Patented.

\* cited by examiner

COMMUNICATION METHOD AND COMMUNICATIONS APPARATUS

CROSS-REFERENCE TO RELATED APPLICATIONS

This application is a continuation of U.S. patent application Ser. No. 17/171,797, filed on Feb. 9, 2021, which is a continuation of International Application No. PCT/CN2019/099898, filed on Aug. 9, 2019, which claims priority to Chinese Patent Application No. 201810912282.0, filed on Aug. 10, 2018 and Chinese Patent Application No. 201910642735.7, filed on Jul. 16, 2019. All of the aforementioned patent applications are hereby incorporated by reference in their entireties.

TECHNICAL FIELD

Embodiments of this application relate to the communications field, and more specifically, to a communication method and a communications apparatus.

BACKGROUND

With development of communications technologies, a quantity of terminal devices in a communications system is also increasing rapidly. For example, with development of the Internet of things (IoT) technology, communication has expanded from the initial human-to-human communication to information exchange and communication between any things, and the quantity of terminal devices significantly increases.

To avoid a resource conflict between different terminal devices, network devices need to bypass used or allocated resources when allocating resources. This increases scheduling complexity of the network devices.

SUMMARY

This application provides a communication method and a communications apparatus, so as to reduce scheduling complexity of a network device.

According to a first aspect, a communication method is provided, where the communication method includes: A terminal device receives downlink control information, where the downlink control information is used to indicate the terminal device to receive or send a first channel on a first resource; the terminal device receives first indication information, where the first indication information is used to indicate a second resource; when the first resource and the second resource overlap in time domain, the terminal device receives or sends the first channel on a third resource, where the third resource and the second resource do not overlap in time domain.

In the communication method in this embodiment of this application, according to an indication of a network device, the terminal device bypasses a resource that is in the first resource and that overlaps with the second resource when receiving or sending the first channel, so that when the network device allocates the first resource for receiving or sending the first channel to the terminal device, the network device can perform scheduling without bypassing the second resource, thereby reducing scheduling complexity of the network device.

Optionally, that the third resource and the second resource do not overlap in time domain may include: The third resource and the second resource do not overlap at all; or there is no overlap between the third resource and the second resource.

Optionally, the first indication information may be further used to indicate that the terminal device is prohibited from using the second resource.

In some possible implementations, that the terminal device receives or sends the first channel on a third resource includes: The terminal device receives or sends the first channel on the third resource according to the second indication information, where the second indication information is used to indicate that when the terminal device determines that a resource occupied by a channel scheduled by the network device overlaps with the second resource in time domain, the terminal device uses a resource that does not overlap with the second resource in time domain to receive or send the channel scheduled by the network device.

In the communication method in this embodiment of this application, the second indication information can flexibly indicate that when the terminal device determines that the resource occupied by the channel scheduled by the network device overlaps with the second resource in time domain, the terminal device uses a resource that does not overlap with the second resource in time domain to receive or send the channel scheduled by the network device. This can make scheduling of the network device more flexible.

Optionally, the second indication information can be used to indicate that when the terminal device determines that the resource occupied by the channel scheduled by the network device overlaps, in time domain, with the resource that is prohibited from being used by the terminal device, the terminal device uses a resource that does not overlap, in time domain, with the resource that is prohibited from being used, to receive or send the channel scheduled by the network device.

Optionally, the second indication information can be used to indicate that when the terminal device determines that the first resource overlaps with the second resource in time domain, the terminal device uses the third resource to receive or send the channel scheduled by the network device.

In some possible implementations, the second indication information is carried in the downlink control information, or the second indication information is carried in the first indication information.

In the communication method in this embodiment of this application, the second indication information is carried in the downlink control information or the first indication information, which can avoid increasing signaling exchange in a system.

In some possible implementations, the third resource includes a part that is of the first resource and that does not overlap with the second resource in time domain.

In the communication method in this embodiment of this application, the third resource includes the part that is of the first resource and that does not overlap with the second resource in time domain. Therefore, the terminal device can perform transmission on the part that is of the first resource and that does not overlap with the second resource in time domain. This can avoid a waste of resources, thereby improving efficiency of the system.

In some possible implementations, the third resource includes a part that does not overlap with the first resource in time domain.

In the communication method in this embodiment of this application, the third resource includes a part that does not overlap with the first resource in time domain. Therefore, even if postponed transmission is performed on a part that is of the first channel and that is mapped on the time-domain overlapping part of the first resource and the second resource, the terminal device can complete postponed transmission of the first channel in the third resource. This increases a success rate of data transmission, thereby improving efficiency of the system.

In some possible implementations, a time domain length of the part that is of the third resource and that does not overlap with the first resource in time domain is greater than or equal to a time domain length of the time-domain overlapping part of the first resource and the second resource.

In the communication method in this embodiment of this application, the time domain length of the part that is of the third resource and that does not overlap with the first resource in time domain is greater than or equal to the time domain length of the time-domain overlapping part of the first resource and the second resource. This can ensure that the terminal device completely transmits the part that is of the first channel and that is mapped on the time-domain overlapping part of the first resource and the second resource, and can ensure integrity of transmitted data, thereby improving stability of the system.

In some possible implementations, that the terminal device receives or sends the first channel on a third resource includes: The terminal device drops the part that is of the first channel and that is mapped on the time-domain overlapping part of the first resource and the second resource.

In the communication method in this embodiment of this application, the terminal device drops the part that is of the first channel and that is mapped on the time-domain overlapping part of the first resource and the second resource. This can avoid a resource conflict, thereby improving stability of the system.

Optionally, the terminal device may drop data, an information element, signaling, or the like that is of the first channel and that is mapped on the time-domain overlapping part of the first resource and the second resource.

In some possible implementations, that the terminal device receives or sends the first channel on a third resource includes: The terminal device postpones receiving or sending the part that is of the first channel and that is mapped on the time-domain overlapping part of the first resource and the second resource.

In the communication method in this embodiment of this application, the terminal device postpones receiving or sending the part that is of the first channel and that is mapped on the time-domain overlapping part of the first resource and the second resource. This can avoid a resource conflict, increase a success rate of data transmission, and improve scheduling flexibility of the network device, thereby improving stability and efficiency of the system.

Optionally, the terminal device may postpone receiving or sending data, an information element, signaling, or the like that is of the first channel and that is mapped on the time-domain overlapping part of the first resource and the second resource.

In some possible implementations, the second resource is a resource allocated by the network device to a communications device other than the terminal device.

In some possible implementations, the first channel includes a dynamic grant channel, and the second resource is used to carry a configured grant channel.

According to a second aspect, a communication method is provided, where the communication method includes: A network device sends downlink control information, where the downlink control information is used to schedule a first resource, and the first resource is used to send or receive a first channel; the network device sends first indication information, where the first indication information is used to indicate a second resource; when the first resource and the second resource overlap in time domain, the network device sends or receives the first channel on a third resource, where the third resource and the second resource do not overlap in time domain.

In the communication method in this embodiment of this application, the network device sends, to a terminal device, indication information indicating the second resource that cannot be used by the terminal device, and according to an indication of the network device, the terminal device bypasses a resource that is in the first resource and that overlaps with the second resource when sending or receiving the first channel, so that when the network device allocates the first resource for receiving or sending the first channel to the terminal device, the network device can perform scheduling without bypassing the second resource, thereby reducing scheduling complexity of the network device.

Optionally, that the third resource and the second resource do not overlap in time domain may include: The third resource and the second resource do not overlap at all; or there is no overlap between the third resource and the second resource.

Optionally, the first indication information may be further used to indicate that the terminal device is prohibited from using the second resource.

In some possible implementations, the communication method further includes: The network device sends second indication information, where the second indication information is used to indicate that when a resource occupied by a channel scheduled by the network device overlaps with the second resource in time domain, the channel scheduled by the network device is sent or received by using a resource that does not overlap with the second resource in time domain.

In the communication method in this embodiment of this application, the second indication information can flexibly indicate that when the resource occupied by the channel scheduled by the network device overlaps with the second resource in time domain, the channel scheduled by the network device is received or sent by using the resource that does not overlap with the second resource in time domain. This can make scheduling of the network device more flexible.

Optionally, the second indication information can be used to indicate that when the terminal device determines that the resource occupied by the channel scheduled by the network device overlaps, in time domain, with the resource that is prohibited from being used by the terminal device, the channel scheduled by the network device is received or sent by using a resource that does not overlap, in time domain, with the resource that is prohibited from being used.

Optionally, the second indication information can be used to indicate that when the terminal device determines that the first resource overlaps with the second resource in time domain, the channel scheduled by the network device is received or sent by using the third resource.

In some possible implementations, the second indication information is carried in the downlink control information, or the second indication information is carried in the first indication information.

In the communication method in this embodiment of this application, the second indication information is carried in the downlink control information or the first indication information, which can avoid increasing signaling exchange in a system.

In some possible implementations, the third resource includes a part that is of the first resource and that does not overlap with the second resource in time domain.

In the communication method in this embodiment of this application, the third resource includes a part that is of the first resource and that does not overlap with the second resource in time domain. Therefore, the network device can perform transmission on the part that is of the first resource and that does not overlap with the second resource in time domain. This can avoid a waste of resources, thereby improving efficiency of the system.

In some possible implementations, the third resource includes a part that does not overlap with the first resource in time domain.

In the communication method in this embodiment of this application, the third resource includes a part that does not overlap with the first resource in time domain. Therefore, even if postponed transmission is performed on a part that is of the first channel and that is mapped on the time-domain overlapping part of the first resource and the second resource, the terminal device can complete postponed transmission of the first channel in the third resource. This increases a success rate of data transmission, thereby improving efficiency of the system.

In some possible implementations, a time domain length of the part that is of the third resource and that does not overlap with the first resource in time domain is greater than or equal to a time domain length of the time-domain overlapping part of the first resource and the second resource.

In the communication method in this embodiment of this application, the time domain length of the part that is of the third resource and that does not overlap with the first resource in time domain is greater than or equal to the time domain length of the time-domain overlapping part of the first resource and the second resource. This can ensure that the network device completely transmits the part that is of the first channel and that is mapped on the time-domain overlapping part of the first resource and the second resource, and can ensure integrity of transmitted data, thereby improving stability of the system.

In some possible implementations, that the network device sends or receives the first channel on a third resource includes: The network device drops the part that is of the first channel and that is mapped on the time-domain overlapping part of the first resource and the second resource.

In the communication method in this embodiment of this application, the network device drops the part that is of the first channel and that is mapped on the time-domain overlapping part of the first resource and the second resource. This can avoid a resource conflict, thereby improving stability of the system.

Optionally, the network device may drop data, an information element, signaling, or the like that is of the first channel and that is mapped on the time-domain overlapping part of the first resource and the second resource.

In some possible implementations, that the network device sends or receives the first channel on a third resource includes: The network device postpones sending or receiving the part that is of the first channel and that is mapped on the time-domain overlapping part of the first resource and the second resource.

In the communication method in this embodiment of this application, the network device postpones receiving or sending the part that is of the first channel and that is mapped on the time-domain overlapping part of the first resource and the second resource. This can avoid a resource conflict, increase a success rate of data transmission, and improve scheduling flexibility of the network device, thereby improving stability and efficiency of the system.

Optionally, the network device may postpone receiving or sending data, an information element, signaling, or the like that is of the first channel and that is mapped on the time-domain overlapping part of the first resource and the second resource.

In some possible implementations, the second resource is a resource allocated by the network device to a communications device other than the terminal device.

In some possible implementations, the first channel includes a dynamic grant channel, and the second resource is used to carry a configured grant channel.

According to a third aspect, this application provides a communications apparatus. The communications apparatus includes a module configured to perform the communication method in any one of the first aspect or the possible implementations of the first aspect. The module included in the communications apparatus can be implemented by software and/or hardware.

In an example, the communications apparatus may include a processor, and the processor is configured to be coupled to a memory, and read and execute an instruction in the memory to: receive downlink control information, where the downlink control information is used to indicate the terminal device to receive or send a first channel on a first resource; receive first indication information, where the first indication information is used to indicate a second resource; when the first resource and the second resource overlap in time domain, receive or send the first channel on a third resource, where the third resource and the second resource do not overlap in time domain.

According to the first indication information, the communications apparatus in this embodiment of this application can bypass a resource that is in the first resource and that overlaps with the second resource when receiving or sending the first channel, so that when a network device allocates the first resource for receiving or sending the first channel to the communications apparatus, the network device can perform scheduling without bypassing the second resource, thereby reducing scheduling complexity of the network device.

Optionally, that the third resource and the second resource do not overlap in time domain may include: The third resource and the second resource do not overlap at all; or there is no overlap between the third resource and the second resource.

Optionally, the first indication information may be further used to indicate that the communications apparatus is prohibited from using the second resource.

In some possible implementations, the processor is specifically configured to: receive or send the first channel on the third resource according to second indication information, where the second indication information is used to indicate that when a resource occupied by a channel scheduled by the network device overlaps with the second resource in time domain, the communications apparatus uses a resource that does not overlap with the second resource in time domain to receive or send the channel scheduled by the network device.

In the communications apparatus in this embodiment of this application, the second indication information can flexibly indicate that when the resource occupied by the channel scheduled by the network device overlaps with the second resource in time domain, the communications apparatus uses a resource that does not overlap with the second resource in time domain to receive or send the channel scheduled by the network device. This can make scheduling of the network device more flexible.

Optionally, the second indication information can be used to indicate that when the resource occupied by the channel scheduled by the network device overlaps, in time domain, with the resource that is prohibited from being used by the communications apparatus, the communications apparatus uses a resource that does not overlap, in time domain, with the resource that is prohibited from being used, to receive or send the channel scheduled by the network device.

Optionally, the second indication information can be used to indicate that when the first resource overlaps with the second resource in time domain, the communications apparatus uses the third resource to receive or send the channel scheduled by the network device.

In some possible implementations, the second indication information is carried in the downlink control information, or the second indication information is carried in the first indication information.

In the communications apparatus in this embodiment of this application, the second indication information is carried in the downlink control information or the first indication information, which can avoid increasing signaling exchange in a system.

In some possible implementations, the third resource includes a part that is of the first resource and that does not overlap with the second resource in time domain.

In the communication apparatus in this embodiment of this application, the third resource includes a part that does not overlap with the first resource in time domain. Therefore, even if postponed transmission is performed on a part that is of the first channel and that is mapped on the time-domain overlapping part of the first resource and the second resource, the terminal device can complete postponed transmission of the first channel in the third resource. This increases a success rate of data transmission, thereby improving efficiency of the system.

In some possible implementations, the third resource includes a part that does not overlap with the first resource in time domain.

In the communication apparatus in this embodiment of this application, the third resource includes a part that does not overlap with the first resource in time domain. Therefore, even if postponed transmission is performed on a part that is of the first channel and that is mapped on the time-domain overlapping part of the first resource and the second resource, the terminal device can complete postponed transmission of the first channel in the third resource. This increases a success rate of data transmission, thereby improving efficiency of the system.

In some possible implementations, a time domain length of the part that is of the third resource and that does not overlap with the first resource in time domain is greater than or equal to a time domain length of the time-domain overlapping part of the first resource and the second resource.

In the communications apparatus in this embodiment of this application, the time domain length of the part that is of the third resource and that does not overlap with the first resource in time domain is greater than or equal to the time domain length of the time-domain overlapping part of the first resource and the second resource. This can ensure that the communications apparatus completely transmits the part that is of the first channel and that is mapped on the time-domain overlapping part of the first resource and the second resource, and can ensure integrity of transmitted data, thereby improving stability of the system.

In some possible implementations, the processor is specifically configured to: drop the part that is of the first channel and that is mapped on the time-domain overlapping part of the first resource and the second resource.

In the communications apparatus in this embodiment of this application, the communications apparatus drops the part that is of the first channel and that is mapped on the time-domain overlapping part of the first resource and the second resource. This can avoid a resource conflict, thereby improving stability of the system.

Optionally, the communications apparatus may drop data, an information element, signaling, or the like that is of the first channel and that is mapped on the time-domain overlapping part of the first resource and the second resource.

In some possible implementations, the processor is specifically configured to: postpone receiving or sending the part that is of the first channel and that is mapped on the time-domain overlapping part of the first resource and the second resource.

In the communications apparatus in this embodiment of this application, the communications apparatus postpones receiving or sending the part that is of the first channel and that is mapped on the time-domain overlapping part of the first resource and the second resource. This can avoid a resource conflict, increase a success rate of data transmission, and improve scheduling flexibility of the network device, thereby improving stability and efficiency of the system.

Optionally, the communications apparatus may postpone receiving or sending data, an information element, signaling, or the like that is of the first channel and that is mapped on the time-domain overlapping part of the first resource and the second resource.

In some possible implementations, the second resource is a resource allocated by the network device to a communications device other than the terminal device.

In some possible implementations, the first channel includes a dynamic grant channel, and the second resource is used to carry a configured grant channel.

In some possible implementations, the communications apparatus further includes the memory.

Optionally, the communications apparatus may further include a transceiver, configured to support the communications apparatus in receiving and/or sending information or data.

Optionally, the communications apparatus may be a terminal device, or may be an apparatus in the terminal device, such as a chip or a chip system. The chip system includes a chip, and may further include another circuit structure or discrete device.

In another example, the communications apparatus may include: a receiving module, configured to receive downlink control information, where the downlink control information is used to indicate the communications apparatus to receive or send a first channel on a first resource; the receiving module is further configured to receive first indication information, where the first indication information is used to indicate a second resource; and a transmission module, configured to: when the first resource and the second resource overlap in time domain, receive or send the first channel on a third resource, where the third resource and the second resource do not overlap in time domain.

According to the first indication information, the communications apparatus in this embodiment of this application can bypass a resource that is in the first resource and that overlaps with the second resource when receiving or sending the first channel, so that when a network device allocates the first resource for receiving or sending the first channel to the communications apparatus, the network device can perform scheduling without bypassing the second resource, thereby reducing scheduling complexity of the network device.

Optionally, that the third resource and the second resource do not overlap in time domain may include: The third resource and the second resource do not overlap at all; or there is no overlap between the third resource and the second resource.

Optionally, the first indication information may be further used to indicate that the communications apparatus is prohibited from using the second resource.

In some possible implementations, the transmission module is specifically configured to: receive or send the first channel on the third resource according to second indication information, where the second indication information is used to indicate that when a resource occupied by a channel scheduled by the network device overlaps with the second resource in time domain, the communications apparatus uses a resource that does not overlap with the second resource in time domain to receive or send the channel scheduled by the network device.

In the communications apparatus in this embodiment of this application, the second indication information can flexibly indicate that when the resource occupied by the channel scheduled by the network device overlaps with the second resource in time domain, the communications apparatus uses a resource that does not overlap with the second resource in time domain to receive or send the channel scheduled by the network device. This can make scheduling of the network device more flexible.

Optionally, the second indication information can be used to indicate that when the resource occupied by the channel scheduled by the network device overlaps, in time domain, with the resource that is prohibited from being used by the communications apparatus, the communications apparatus uses a resource that does not overlap, in time domain, with the resource that is prohibited from being used, to receive or send the channel scheduled by the network device.

Optionally, the second indication information can be used to indicate that after the communications apparatus determines that the first resource overlaps with the second resource in time domain, the communications apparatus uses the third resource to receive or send the channel scheduled by the network device.

In some possible implementations, the second indication information is carried in the downlink control information, or the second indication information is carried in the first indication information.

In the communications apparatus in this embodiment of this application, the second indication information is carried in the downlink control information or the first indication information, which can avoid increasing signaling exchange in a system.

In some possible implementations, the third resource includes a part that is of the first resource and that does not overlap with the second resource in time domain.

In the communications apparatus in this embodiment of this application, the third resource includes a part that is of the first resource and that does not overlap with the second resource in time domain. Therefore, the communications apparatus can perform transmission on the part that is of the first resource and that does not overlap with the second resource in time domain. This can avoid a waste of resources, thereby improving efficiency of the system.

In some possible implementations, the third resource includes a part that does not overlap with the first resource in time domain.

In the communications apparatus in this embodiment of this application, the third resource includes a part that does not overlap with the first resource in time domain. Therefore, the communications apparatus can transmit a part that is of the first channel and that is mapped on the time-domain overlapping part of the first resource and the second resource. This increases a success rate of data transmission, thereby improving efficiency of the system.

In some possible implementations, a time domain length of the part that is of the third resource and that does not overlap with the first resource in time domain is greater than or equal to a time domain length of the time-domain overlapping part of the first resource and the second resource.

In the communications apparatus in this embodiment of this application, the time domain length of the part that is of the third resource and that does not overlap with the first resource in time domain is greater than or equal to the time domain length of the time-domain overlapping part of the first resource and the second resource. This can ensure that the communications apparatus completely transmits the part that is of the first channel and that is mapped on the time-domain overlapping part of the first resource and the second resource, and can ensure integrity of transmitted data, thereby improving stability of the system.

In some possible implementations, the transmission module is specifically configured to: drop the part that is of the first channel and that is mapped on the time-domain overlapping part of the first resource and the second resource.

In the communications apparatus in this embodiment of this application, the communications apparatus drops the part that is of the first channel and that is mapped on the time-domain overlapping part of the first resource and the second resource. This can avoid a resource conflict, thereby improving stability of the system.

Optionally, the communications apparatus may drop data, an information element, signaling, or the like that is of the first channel and that is mapped on the time-domain overlapping part of the first resource and the second resource.

In some possible implementations, the transmission module is specifically configured to: postpone receiving or sending the part that is of the first channel and that is mapped on the time-domain overlapping part of the first resource and the second resource.

In the communications apparatus in this embodiment of this application, the communications apparatus postpones receiving or sending the part that is of the first channel and that is mapped on the time-domain overlapping part of the first resource and the second resource. This can avoid a resource conflict, increase a success rate of data transmission, and improve scheduling flexibility of the network device, thereby improving stability and efficiency of the system.

Optionally, the communications apparatus may postpone receiving or sending data, an information element, signaling, or the like that is of the first channel and that is mapped on the time-domain overlapping part of the first resource and the second resource.

In some possible implementations, the second resource is a resource allocated by the network device to a communications device other than the communications apparatus.

In some possible implementations, the first channel includes a dynamic grant channel, and the second resource is used to carry a configured grant channel.

According to a fourth aspect, this application provides a communications apparatus. The communications apparatus includes a module configured to perform the communication method in any one of the second aspect or the possible implementations of the second aspect. The module included in the communications apparatus can be implemented by software and/or hardware.

In an example, the communications apparatus may include a processor, and the processor is configured to be coupled to a memory, and read and execute an instruction in the memory to: send downlink control information, where the downlink control information is used to schedule a first resource, and the first resource is used to send or receive a first channel; send first indication information, where the first indication information is used to indicate a second resource; when the first resource and the second resource overlap in time domain, send or receive the first channel on a third resource, where the third resource and the second resource do not overlap in time domain.

The communications apparatus in this embodiment of this application sends, to a terminal device, indication information indicating the second resource that cannot be used by the terminal device, and according to an indication of the communications apparatus, the terminal device bypasses a resource that is in the first resource and that overlaps with the second resource when sending or receiving the first channel, so that when the communications apparatus allocates the first resource for receiving or sending the first channel to the terminal device, the communications apparatus can perform scheduling without bypassing the second resource, thereby reducing scheduling complexity of the communications apparatus.

Optionally, that the third resource and the second resource do not overlap in time domain may include: The third resource and the second resource do not overlap at all; or there is no overlap between the third resource and the second resource.

Optionally, the first indication information may be further used to indicate that the terminal device is prohibited from using the second resource.

In some possible implementations, the processor is further configured to: send second indication information, where the second indication information is used to indicate that when a resource occupied by a channel scheduled by the communications apparatus overlaps with the second resource in time domain, the channel scheduled by the communications apparatus is sent or received by using a resource that does not overlap with the second resource in time domain.

Optionally, the second indication information can be used to indicate that when the resource occupied by the channel scheduled by the communications apparatus overlaps, in time domain, with the resource that is prohibited from being used by the terminal device, the channel scheduled by the communications apparatus is received or sent by using a resource that does not overlap, in time domain, with the resource that is prohibited from being used.

In the communications apparatus in this embodiment of this application, the second indication information can flexibly indicate that when the resource occupied by the channel scheduled by the communications apparatus overlaps with the second resource in time domain, the channel scheduled by the communications apparatus is received or sent by using the resource that does not overlap with the second resource in time domain. This can make scheduling of the communications apparatus more flexible.

Optionally, the second indication information can be used to indicate that when the first resource overlaps with the second resource in time domain, the channel scheduled by the communications apparatus is received or sent by using the third resource.

In some possible implementations, the second indication information is carried in the downlink control information, or the second indication information is carried in the first indication information.

In the communications apparatus in this embodiment of this application, the second indication information is carried in the downlink control information or the first indication information, which can avoid increasing signaling exchange in a system.

In some possible implementations, the third resource includes a part that is of the first resource and that does not overlap with the second resource in time domain.

In the communications apparatus in this embodiment of this application, the third resource includes a part that is of the first resource and that does not overlap with the second resource in time domain. Therefore, the communications apparatus can perform transmission on the part that is of the first resource and that does not overlap with the second resource in time domain. This can avoid a waste of resources, thereby improving efficiency of the system.

In some possible implementations, the third resource includes a part that does not overlap with the first resource in time domain.

In the communications apparatus in this embodiment of this application, the third resource includes a part that does not overlap with the first resource in time domain. Therefore, the communications apparatus can transmit a part that is of the first channel and that is mapped on the time-domain overlapping part of the first resource and the second resource. This increases a success rate of data transmission, thereby improving efficiency of the system.

In some possible implementations, a time domain length of the part that is of the third resource and that does not overlap with the first resource in time domain is greater than or equal to a time domain length of the time-domain overlapping part of the first resource and the second resource.

In the communications apparatus in this embodiment of this application, the time domain length of the part that is of the third resource and that does not overlap with the first resource in time domain is greater than or equal to the time domain length of the time-domain overlapping part of the first resource and the second resource. This can ensure that the communications apparatus completely transmits the part that is of the first channel and that is mapped on the time-domain overlapping part of the first resource and the second resource, and can ensure integrity of transmitted data, thereby improving stability of the system.

In some possible implementations, the processor is specifically configured to: drop the part that is of the first channel and that is mapped on the time-domain overlapping part of the first resource and the second resource.

In the communications apparatus in this embodiment of this application, the communications apparatus drops the part that is of the first channel and that is mapped on the time-domain overlapping part of the first resource and the second resource. This can avoid a resource conflict, thereby improving stability of the system.

Optionally, the communications apparatus may drop data, an information element, signaling, or the like that is of the first channel and that is mapped on the time-domain overlapping part of the first resource and the second resource.

In some possible implementations, the processor is specifically configured to: postpone sending or receiving the part that is of the first channel and that is mapped on the time-domain overlapping part of the first resource and the second resource.

In the communications apparatus in this embodiment of this application, the communications apparatus postpones receiving or sending the part that is of the first channel and that is mapped on the time-domain overlapping part of the first resource and the second resource. This can avoid a resource conflict, increase a success rate of data transmission, and improve scheduling flexibility of the communications apparatus, thereby improving stability and efficiency of the system.

Optionally, the communications apparatus may postpone receiving or sending data, an information element, signaling, or the like that is of the first channel and that is mapped on the time-domain overlapping part of the first resource and the second resource.

In some possible implementations, the second resource is a resource allocated by the network device to a communications device other than the terminal device.

In some possible implementations, the first channel includes a dynamic grant channel, and the second resource is used to carry a configured grant channel.

In some possible implementations, the communications apparatus further includes the memory.

Optionally, the communications apparatus may further include a transceiver, configured to support the communications apparatus in receiving and/or sending information or data.

Optionally, the communications apparatus may be a network device, or may be an apparatus in the network device, such as a chip or a chip system. The chip system includes a chip, and may further include another circuit structure or discrete device.

In another example, the communications apparatus may include: a sending module, configured to send downlink control information, where the downlink control information is used to schedule a first resource, and the first resource is used to send or receive a first channel; the sending module is further configured to send first indication information, where the first indication information is used to indicate a second resource; and a transmission module, configured to: when the first resource and the second resource overlap in time domain, send or receive the first channel on a third resource, where the third resource and the second resource do not overlap in time domain.

The communications apparatus in this embodiment of this application is configured to send, to a terminal device, indication information indicating the second resource that cannot be used by the terminal device, and according to an indication of the communications apparatus, the terminal device bypasses a resource that is in the first resource and that overlaps with the second resource when sending or receiving the first channel, so that when the communications apparatus allocates the first resource for receiving or sending the first channel to the terminal device, the communications apparatus can perform scheduling without bypassing the second resource, thereby reducing scheduling complexity of the communications apparatus.

Optionally, that the third resource and the second resource do not overlap in time domain may include: The third resource and the second resource do not overlap at all; or there is no overlap between the third resource and the second resource.

Optionally, the first indication information may be further used to indicate that the terminal device is prohibited from using the second resource.

In some possible implementations, the transmission module is further configured to: send second indication information, where the second indication information is used to indicate that when a resource occupied by a channel scheduled by the communications apparatus overlaps with the second resource in time domain, the channel scheduled by the communications apparatus is sent or received by using a resource that does not overlap with the second resource in time domain.

In the communications apparatus in this embodiment of this application, the second indication information can flexibly indicate that when the resource occupied by the channel scheduled by the communications apparatus overlaps with the second resource in time domain, the channel scheduled by the communications apparatus is received or sent by using the resource that does not overlap with the second resource in time domain. This can make scheduling of the communications apparatus more flexible.

Optionally, the second indication information can be used to indicate that when the resource occupied by the channel scheduled by the communications apparatus overlaps, in time domain, with the resource that is prohibited from being used by the terminal device, the channel scheduled by the communications apparatus is received or sent by using a resource that does not overlap, in time domain, with the resource that is prohibited from being used.

Optionally, the second indication information can be used to indicate that when the first resource overlaps with the second resource in time domain, the channel scheduled by the communications apparatus is received or sent by using the third resource.

In some possible implementations, the second indication information is carried in the downlink control information, or the second indication information is carried in the first indication information.

In the communications apparatus in this embodiment of this application, the second indication information is carried in the downlink control information or the first indication information, which can avoid increasing signaling exchange in a system.

In some possible implementations, the third resource includes a part that is of the first resource and that does not overlap with the second resource in time domain.

In the communications apparatus in this embodiment of this application, the third resource includes a part that is of the first resource and that does not overlap with the second resource in time domain. Therefore, the communications apparatus can perform transmission on the part that is of the first resource and that does not overlap with the second resource in time domain. This can avoid a waste of resources, thereby improving efficiency of the system.

In some possible implementations, the third resource includes a part that does not overlap with the first resource in time domain.

In the communications apparatus in this embodiment of this application, the third resource includes a part that does not overlap with the first resource in time domain. Therefore, the communications apparatus can transmit a part that is of the first channel and that is mapped on the time-domain overlapping part of the first resource and the second resource. This increases a success rate of data transmission, thereby improving efficiency of the system.

In some possible implementations, a time domain length of the part that is of the third resource and that does not overlap with the first resource in time domain is greater than or equal to a time domain length of the time-domain overlapping part of the first resource and the second resource.

In the communications apparatus in this embodiment of this application, the time domain length of the part that is of the third resource and that does not overlap with the first resource in time domain is greater than or equal to the time domain length of the time-domain overlapping part of the first resource and the second resource. This can ensure that the communications apparatus completely transmits the part that is of the first channel and that is mapped on the time-domain overlapping part of the first resource and the second resource, and can ensure integrity of transmitted data, thereby improving stability of the system.

In some possible implementations, the transmission module is specifically configured to: drop the part that is of the first channel and that is mapped on the time-domain overlapping part of the first resource and the second resource.

In the communications apparatus in this embodiment of this application, the communications apparatus drops the part that is of the first channel and that is mapped on the time-domain overlapping part of the first resource and the second resource. This can avoid a resource conflict, thereby improving stability of the system.

Optionally, the communications apparatus may drop data, an information element, signaling, or the like that is of the first channel and that is mapped on the time-domain overlapping part of the first resource and the second resource.

In some possible implementations, the transmission module is specifically configured to: postpone sending or receiving the part that is of the first channel and that is mapped on the time-domain overlapping part of the first resource and the second resource.

In the communications apparatus in this embodiment of this application, the communications apparatus postpones receiving or sending the part that is of the first channel and that is mapped on the time-domain overlapping part of the first resource and the second resource. This can avoid a resource conflict, increase a success rate of data transmission, and improve scheduling flexibility of the network device, thereby improving stability and efficiency of the system.

Optionally, the communications apparatus may postpone receiving or sending data, an information element, signaling, or the like that is of the first channel and that is mapped on the time-domain overlapping part of the first resource and the second resource.

In some possible implementations, the second resource is a resource allocated by the communications apparatus to a communications device other than the terminal device.

In some possible implementations, the first channel includes a dynamic grant channel, and the second resource is used to carry a configured grant channel.

According to a fifth aspect, a computer-readable storage medium is provided, where the computer-readable storage medium stores program code to be executed by a communications apparatus, and the program code includes an instruction used to implement the communication method in any one of the first aspect or the possible implementations of the first aspect.

According to a sixth aspect, a computer-readable storage medium is provided, where the computer-readable storage medium stores program code to be executed by a communications apparatus, and the program code includes an instruction used to implement the communication method in any one of the second aspect or the possible implementations of the second aspect.

According to a seventh aspect, a chip is provided, where the chip includes a processor and a communications interface, the communications interface is configured to communicate with an external device, and the processor is configured to implement the communication method in any one of the first aspect or the possible implementations of the first aspect.

Optionally, the chip may further include a memory; the memory stores an instruction; the processor is configured to execute the instruction stored in the memory; and when the instruction is executed, the processor is configured to implement the communication method in any one of the first aspect or the possible implementations of the first aspect.

According to an eighth aspect, a chip is provided, where the chip includes a processor and a communications interface, the communications interface is configured to communicate with an external device, and the processor is configured to implement the communication method in any one of the second aspect or the possible implementations of the second aspect.

Optionally, the chip may further include a memory; the memory stores an instruction; the processor is configured to execute the instruction stored in the memory; and when the instruction is executed, the processor is configured to implement the communication method in any one of the second aspect or the possible implementations of the second aspect.

According to a ninth aspect, a computer program product including an instruction is provided, where when the computer program product runs on a communications apparatus, the communications apparatus is enabled to perform the communication method in any one of the first aspect or the possible implementations of the first aspect.

According to a tenth aspect, a computer program product including an instruction is provided, where when the computer program product runs on a communications apparatus, the communications apparatus is enabled to perform the communication method in any one of the second aspect or the possible implementations of the second aspect.

According to the communication method in this application, according to an indication of the network device, the terminal device bypasses a resource that is in the first resource and that overlaps with the second resource when receiving or sending the first channel, so that when the network device allocates the first resource for receiving or sending the first channel to the terminal device, the network device can perform scheduling without bypassing the second resource, thereby reducing scheduling complexity of the network device.

According to an eleventh aspect, a communication method is provided, where the method may be performed by a network device, or may be performed by a chip or circuit configured in the network device. This is not limited in this application.

Specifically, the method includes: A first network device determines a third resource; and the first network device sends configuration information to a second network device, where the configuration information is used to indicate the third resource, the first network device belongs to a first system, the second network device belongs to a second system, there is an overlapping part between a frequency domain resource occupied by the first system and a frequency domain resource occupied by the second system, and the third resource is located in the overlapping part and is a resource reserved by the first system for the second system.

In this embodiment of this application, the first network device belonging to the first system sends configuration information to the second network device belonging to the second system. The configuration information is used to indicate the third resource, and the third resource is a resource reserved by the first system for the second system, so that the second network device can use the third resource, thereby improving utilization efficiency of resources and avoiding a waste of resources.

Optionally, the third resource may be a resource reserved in advance by the first system.

Optionally, the third resource may be a resource that is not used by the first system. For example, the third resource may be a resource that is prohibited from being used by all terminal devices in the first system (in other words, the third resource is an invalid resource for all the terminal devices in the first system).

Optionally, the third resource may be a resource belonging to the first system, and is a resource that is not used by the first system but reserved for the second system to use.

In some possible implementations, the first system is a narrowband system, and the second system is a broadband system.

Optionally, the first system may be an NB-IoT system or an MTC system.

Optionally, the second system may be any one of an NR system, an LTE system, an LTE-advanced system, and the like.

Optionally, the first system may be an NB-IoT system, and the second system may be an MTC system.

In some possible implementations, the third resource is a resource on an anchor carrier of the narrowband Internet of things system, and the configuration information includes time domain information of the third resource.

In some possible implementations, the third resource is a resource on a non-anchor carrier of the narrowband Internet of things system, and the configuration information includes time domain information and frequency domain information of the third resource.

Optionally, the configuration information may include a start position of the third resource in time domain or frequency domain, an offset of the third resource in time domain or frequency domain, duration of the third resource in time domain, a bandwidth of the third resource in frequency domain, and the like. This is not limited in this application.

Optionally, the third resource may also be a periodic resource, that is, the third resource is a resource that appears periodically, and the configuration information may further include periodicity information of the third resource.

In some possible implementations, the time domain information is indicated by a bitmap.

According to a twelfth aspect, a communication method is provided, where the method may be performed by a network device, or may be performed by a chip or circuit configured in the network device. This is not limited in this application.

Specifically, the method includes: A second network device receives configuration information sent by a first network device, where the configuration information is used to indicate a third resource; and the second network device uses the third resource to transmit data, where the first network device belongs to a first system, the second network device belongs to a second system, there is an overlapping part between a frequency domain resource occupied by the first system and a frequency domain resource occupied by the second system, and the third resource is located in the overlapping part and is a resource reserved by the first system for the second system.

In some possible implementations, the first system is a narrowband system, and the second system is a broadband system.

In some possible implementations, the first system is a narrowband Internet of things system.

In some possible implementations, the third resource is a resource on an anchor carrier of the narrowband Internet of things system, and the configuration information includes time domain information of the third resource.

In some possible implementations, the third resource is a resource on a non-anchor carrier of the narrowband Internet of things system, and the configuration information includes time domain information and frequency domain information of the third resource.

In some possible implementations, the time domain information is indicated by a bitmap.

According to a thirteenth aspect, a communications apparatus is provided, where the communications apparatus includes: a determining unit, configured to determine a third resource; and a sending unit, configured to send configuration information to a second network device, where the configuration information is used to indicate the third resource, the communications apparatus belongs to a first system, the second network device belongs to a second system, there is an overlapping part between a frequency domain resource occupied by the first system and a frequency domain resource occupied by the second system, and the third resource is located in the overlapping part and is a resource reserved by the first system for the second system.

In some possible implementations, the first system is a narrowband system, and the second system is a broadband system.

In some possible implementations, the first system is a narrowband Internet of things system.

In some possible implementations, the third resource is a resource on an anchor carrier of the narrowband Internet of things system, and the configuration information includes time domain information of the third resource.

In some possible implementations, the third resource is a resource on a non-anchor carrier of the narrowband Internet of things system, and the configuration information includes time domain information and frequency domain information of the third resource.

In some possible implementations, the time domain information is indicated by a bitmap.

According to a fourteenth aspect, a communications apparatus is provided, where the communications apparatus includes: a receiving unit, configured to receive configuration information sent by a first network device, where the configuration information is used to indicate a third resource; and a transmission unit, configured to use the third resource to transmit data, where the first network device belongs to a first system, the communications apparatus belongs to a second system, there is an overlapping part between a frequency domain resource occupied by the first system and a frequency domain resource occupied by the second system, and the third resource is located in the overlapping part and is a resource reserved by the first system for the second system.

In some possible implementations, the first system is a narrowband system, and the second system is a broadband system.

In some possible implementations, the first system is a narrowband Internet of things system.

In some possible implementations, the third resource is a resource on an anchor carrier of the narrowband Internet of things system, and the configuration information includes time domain information of the third resource.

In some possible implementations, the third resource is a resource on a non-anchor carrier of the narrowband Internet of things system, and the configuration information includes time domain information and frequency domain information of the third resource.

In some possible implementations, the time domain information is indicated by a bitmap.

According to a fifteenth aspect, a communications apparatus is provided, where the apparatus may be a network device, or may be a chip or a chip system in the network device. The apparatus may include a processing unit and a transceiver unit. When the apparatus is a network device, the processing unit may be a processor and the transceiver unit may be a transceiver. The network device may further include a storage unit, and the storage unit may be a memory. The storage unit is configured to store an instruction, and the processing unit executes the instruction stored in the storage unit, so that the network device performs the method according to the eleventh aspect or the twelfth aspect. When the apparatus is a chip or a chip system in the network device, the processing unit may be a processor, and the transceiver unit may be an input/output interface, a pin, a circuit, or the like. The processing unit executes an instruction stored in a storage unit, so that the network device performs the method according to the eleventh aspect or the twelfth aspect. The storage unit may be a storage unit (such as a register or a cache) in the chip, or may be a storage unit (such as a read-only memory or a random access memory) located out of the chip and in the network device.

According to a sixteenth aspect, a communications apparatus is provided, where the communications apparatus includes at least one processor, and the at least one processor is configured to be coupled to a memory, and read and execute an instruction in the memory, to implement any method according to the eleventh aspect or the twelfth aspect.

According to a seventeenth aspect, a computer program product is provided, where the computer program product includes computer program code, and when the computer program code is run on a computer, the computer is enabled to perform the method according to the eleventh aspect or the twelfth aspect.

It should be noted that the foregoing computer program code may be completely or partially stored in a first storage medium, where the first storage medium may be packaged with the processor or packaged separately from the processor. This is not specifically limited in this application.

According to an eighteenth aspect, a chip system is provided, where the chip system includes a processor, configured to invoke a computer program from a memory and run the computer program, so that a communications device onto which the chip system is installed performs the method according to the eleventh aspect or the twelfth aspect.

According to a nineteenth aspect, a computer-readable medium is provided, where the computer-readable medium stores program code, and when the computer program code is run on a computer, the computer is enabled to perform the method according to the eleventh aspect or the twelfth aspect.

DESCRIPTION OF EMBODIMENTS

Figure 1:
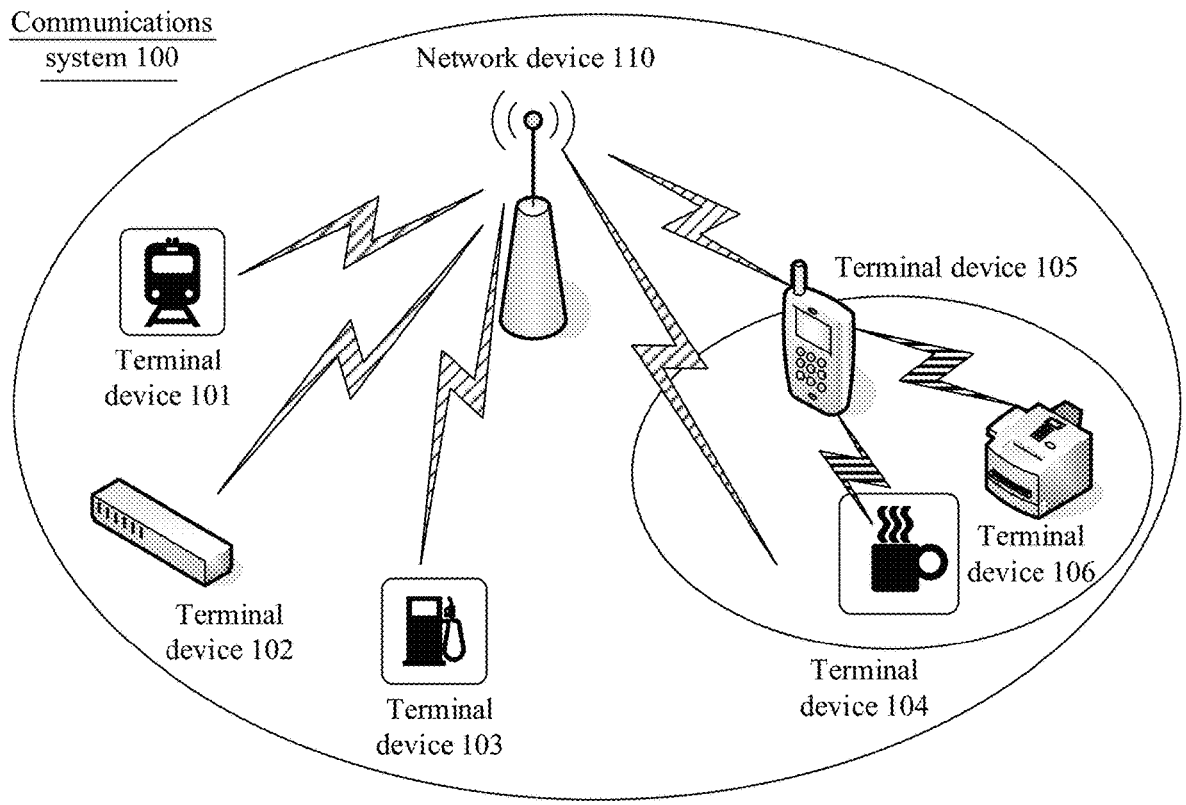
FIG. 1 is a schematic architectural diagram of a communications system to which a communication method according to an embodiment of this application may be applied.

The following describes technical solutions of this application with reference to accompanying drawings.

The technical solutions of the embodiments of this application may be applied to various communications systems, such as: a global system for mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, a 5th generation (5G) system, or a new radio (NR) system.

As an example rather than a limitation, the terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a station (ST) in WLAN, and may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, and a next-generation communications system, for example, a terminal device in a 5G network, or a terminal device in a future evolved public land mobile network (PLMN).

By way of example but not limitation, in the embodiments of this application, the terminal device may also be a wearable device. The wearable device may also be referred to as a wearable intelligent device, and is a collective name of wearable devices, such as glasses, gloves, watches, clothes, and shoes, obtained after a wearable technology is used for intelligent design and development of daily wear. A wearable device is a portable device that can be directly worn or integrated into clothes or an accessory of a user. The wearable device not only is a hardware device, but also implements a strong function through software support, data exchange, and cloud interaction. A generic wearable intelligent device includes a wearable device including complete functions and a large size, and capable of implementing all or some functions without relying on a smartphone, for example, a smartwatch or smart glasses; and a wearable device focusing only on a particular type of application function and needing to be used together with another device such as a smartphone, for example, various smart bands and smart jewelry performing vital sign monitoring.

In addition, in the embodiments of this application, the terminal device may also be a terminal device in an Internet of things (IoT) system. IoT is an important part of information technology development in the future. A main technical feature of IoT is to connect things to a network by using a communications technology, thereby implementing an intelligent network of human-machine interconnection and interconnection of things.

In the embodiments of this application, the IoT technology can achieve massive connections, deep coverage, and power saving for terminals through, for example, the narrowband NB technology.

In addition, in this application, the terminal device may further include sensors such as a smart printer, a train detector, and a gas station. Main functions include collecting data (by some terminal devices), receiving control information and downlink data from a network device, and sending an electromagnetic wave and transmitting uplink data to the network device.

In the embodiments of this application, the network device may be a device used to communicate with a mobile device, such as an access network device.

By way of example but not limitation, in this application, the network device may be an access point (AP) in a WLAN or a base transceiver station (BTS) in GSM or CDMA, or may be a NodeB (NB) in WCDMA or a gNB in a new radio (NR) system, or may be an evolved NodeB (eNB, or eNodeB) in LTE, a relay station, an access point, a vehicle-mounted device, a wearable device, an access network device in a 5G network, an access network device in a future evolved PLMN, or the like.

In addition, in the embodiments of this application, the access network device provides a service for a cell. The terminal device communicates with the access network device by using a transmission resource (for example, a frequency domain resource, in other words, a spectrum resource) used in the cell. The cell may be a cell corresponding to the access network device (for example, a base station). The cell may belong to a macro base station, or a base station corresponding to a small cell. The small cell herein may include a metro cell, a micro cell, a pico cell, a femto cell, or the like. The small cells feature small coverage and low transmit power, and are suitable for providing a high-rate data transmission service.

In this application, the network device may include a base station (gNB), such as a macro station, a micro base station, an indoor hotspot, and a relay node. Functions of the network device are to send a radio wave to a terminal device, so as to transmit downlink data on one hand, and send scheduling information to control uplink transmission on the other hand; and to receive the radio wave sent by the terminal device and receive uplink data transmission.

The functions and specific implementations of the terminal device and the network device listed above are merely examples for description, and this application is not limited thereto.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, such as a Linux operating system, a Unix operating system, an Android operating system, an iOS operating system, or a Windows operating system. The application layer includes applications such as a browser, an address book, word processing software, and instant messaging software. In addition, the embodiments of this application do not particularly limit a specific structure of an execution body of the method provided in the embodiments of this application, provided that a program recording code of the method provided in the embodiments of this application can be run to perform communication according to the method provided in the embodiments of this application. For example, the method provided in the embodiments of this application may be performed by a terminal device or a network device, or a functional module that is in the terminal device or the network device and that is capable of invoking and executing a program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD)), a digital versatile disc (DVD), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry an instruction and/or data.

It should be noted that in this embodiment of this application, a plurality of application programs can be run at the application layer. In this case, the application program that performs the communication method in the embodiments may be different from an application program that is used to control a receive end device to complete an action corresponding to the received data.

FIG. 1 is an example architectural diagram of a communications system 100 according to an embodiment of this application. The method in the embodiments of this application may be applied to the communications system 100 shown in FIG. 1. It should be understood that the communications system 100 to which the method in the embodiments of this application may be applied may include more or fewer network devices or terminal devices.

The network device or the terminal device in FIG. 1 may be hardware, or may be functionally divided software, or a combination thereof. The network device or the terminal device in FIG. 1 can communicate with each other through another device or network element.

In the communications system 100 shown in FIG. 1, a network device 110 and a terminal device 101 to a terminal device 106 form the communications system 100. In the communications system 100, the network device 110 may send downlink data to the terminal device 101 to the terminal device 106. Certainly, the terminal device 101 to the terminal device 106 may also send uplink data to the network device 110. It should be understood that the terminal device 101 to the terminal device 106 may be, for example, cellular phones, smartphones, portable computers, handheld communications devices, handheld computing devices, satellite radio apparatuses, global positioning systems, PDAs, and/or any other suitable devices used to perform communication in the wireless communications system 100.

The communications system 100 may be a PLMN, a device-to-device (D2D) network, a machine to machine (M2M) network, an IoT network, or another network. In addition, the terminal device 104 to the terminal device 106 may also form a communications system. In this communications system, the terminal device 105 may send downlink data to the terminal device 104 or the terminal device 106.

In the embodiments of this application, data or information may be carried by a time-frequency resource, where the time-frequency resource may include a resource in time domain and a resource in frequency domain. In time domain, the time-frequency resource may include one or more time domain units, and in frequency domain, the time-frequency resource may include a frequency domain unit.

A time domain unit may be a symbol, a mini-slot, a slot, or a subframe. Duration of one subframe in time domain may be 1 millisecond (ms), one slot includes 7 or 14 symbols, and one mini-slot may include at least one symbol (for example, 2 symbols, 7 symbols, 14 symbols, or symbols whose quantity is less than or equal to 14).

One frequency domain unit may be one resource block (RB), or one resource block group (RBG), or one predefined subband.

In the embodiments of this application, "data" or "information" may be understood as a bit generated after an information block is coded, or "data" or "information" may alternatively be understood as a modulation symbol generated after an information block is coded and modulated.

The communication method in this application may be used to transmit a plurality of types of services. For example, the plurality of types of services may include but are not limited to: a. an ultra-reliable low-latency communication (URLLC) service; b. an enhanced mobile broadband (eMBB) service. Specifically, the International Telecommunications Union-Radio Communications Sector (ITU-R) has defined future 5G application scenarios, which may include eMBB and URLLC, and has defined capability requirements for 5G networks based on eight dimensions such as a throughput rate, a latency, connection density, and spectrum efficiency improvement. The eMBB service mainly requires a high rate, wide coverage, a low transmission latency, and mobility. The URLLC service mainly requires ultra-high reliability, and ultra-low mobility and a low transmission latency. Generally, a wireless air interface is required to achieve 99.999% transmission reliability within 1 millisecond (ms).

In the embodiments of this application, each communications device (for example, the network device or the terminal device) in the communications system 100 may communicate by using a resource (for example, a frequency domain resource) based on a grant-free transmission solution, or may communicate by using a resource (for example, a frequency domain resource) in a grant manner. This is not particularly limited in the embodiments of this application. The following separately describes the grant manner and the grant-free manner.

A. Grant Manner

Specifically, in the embodiments of this application, data transmission (for example, uplink transmission or downlink transmission) may be performed based on scheduling of the network device. By way of example but not limitation, a time-domain granularity of the scheduled data transmission may be, for example, a transmission time interval (TTI), a short transmission time interval (sTTI), a slot, or a mini-slot.

A specific scheduling procedure is that the network device sends a control channel, for example, a physical downlink control channel (PDCCH), an enhanced physical downlink control channel (EPDCCH), or a physical downlink control channel for scheduling an sTTI for transmission (sTTI Physical Downlink Control Channel, sPDCCH). The control channel may carry scheduling information that is in different downlink control information (DCI) formats and that is used to schedule a physical downlink shared channel (PDSCH) or a physical uplink shared channel (PUSCH). The scheduling information includes control information such as resource allocation information and a modulation and coding scheme. The terminal device detects the control channel, and receives a downlink data channel or sends an uplink data channel based on scheduling information carried on the detected control channel. After the sTTI technology is introduced, the scheduling information carried on the control channel may indicate to receive a downlink data channel whose TTI length is 1 ms or whose TTI length is less than 1 ms or send an uplink data channel whose TTI length is 1 ms or whose TTI length is less than 1 ms. In addition, in NR, which symbols are occupied for data transmission scheduled may be directly indicated.

B. Grant-Free Manner

Specifically, a grant-free transmission solution can be used to provide a large amount of low-latency and high-reliability service transmission in a future network. In the embodiments of this application, data transmission may alternatively be grant-free. The grant-free transmission herein may be for uplink data transmission or downlink data transmission. The grant-free transmission may be understood as any one or more of the following meanings, a combination of some technical features in a plurality of meanings, or another similar meaning.

The grant-free transmission may mean that a network device pre-allocates a plurality of transmission resources, and notifies a terminal device of the plurality of transmission resources; when needing to transmit data, the terminal device selects at least one transmission resource from the plurality of transmission resources pre-allocated by the network device, and sends or receives the data by using the selected transmission resource; and the network device receives the data from the terminal device or sends data to the terminal device on one or more transmission resources in the plurality of pre-allocated transmission resources.

The grant-free transmission may mean that a network device pre-allocates a plurality of transmission resources, and notifies a terminal device of the plurality of transmission resources, so that when needing to transmit data, the terminal device selects at least one transmission resource from the plurality of transmission resources pre-allocated by the network device, and sends or receives the data by using the selected transmission resource.

The grant-free transmission may be a method in which data of a terminal device can be transmitted without dynamic scheduling by a network device. The dynamic scheduling may be a scheduling manner in which the network device indicates a transmission resource for each data transmission of the terminal device by using signaling. Optionally, transmitting data of a terminal device may be understood as allowing data of two or more terminal devices to be transmitted on a same time-frequency resource. Optionally, the transmission resource may be a transmission resource of one or more transmission time units after a moment at which the terminal device receives the signaling. A transmission time unit may be a minimum time unit, such as a TTI or a slot, of one transmission.

The grant-free transmission may mean that a terminal device transmits data without scheduling by a network device. The scheduling may mean that the terminal device sends an uplink scheduling request to the network device, and the network device sends an uplink grant to the terminal device after receiving the scheduling request. The uplink grant indicates an uplink transmission resource allocated to the terminal device.

The grant-free transmission may be a contention-based transmission manner, and specifically may mean that a plurality of terminals simultaneously transmit data on a same pre-allocated time-frequency resource without scheduling by a network device.

The data may include service data or signaling data.

By way of example but not limitation, in the embodiments of this application, a basic time unit of the grant-free transmission may be one TTI (for example, the foregoing sTTI). After an sTTI technology is introduced, the grant-free transmission may include receiving a downlink data channel whose TTI length is 1 ms or less than 1 ms, or sending an uplink data channel whose TTI length is 1 ms or less than 1 ms.

In the embodiments of this application, "scheduling" (Grant) may also be referred to as "grant", which refers to control information that is sent by a network device (for example, a gNB) or configured by a higher layer, and that is used to indicate a transmission feature between the network device and a terminal device.

Optionally, grant may also be divided into dynamic grant and configured grant.

The dynamic grant refers to normal grant-based (GB) transmission, that is, the transmission of the dynamic grant may be transmission in the foregoing grant manner.

The configured grant refers to configuration-based transmission, that is, the transmission of the configured grant may be transmission in the foregoing grant-free manner.

For example, the configured grant may include semi-persistent scheduling (SPS). The semi-persistent scheduling may also be referred to as semi-static scheduling.

For another example, the configured grant may include grant-free (GF) transmission in the NR.

In the embodiments of this application, when the network device schedules the terminal device, a conflict with a reserved resource may occur.

In the embodiments of this application, a resource conflict can be understood as an overlap of resources in time domain and frequency domain.

Optionally, the overlap of resources in time domain may include an overlap of resources in time domain and frequency domain at the same time, where the overlap herein may include a partial overlap or a complete overlap. For ease of description, in this application, the reserved resource may be referred to as resource #B, and a resource for data transmission by another terminal device may be referred to as resource #A.

Figure 3:
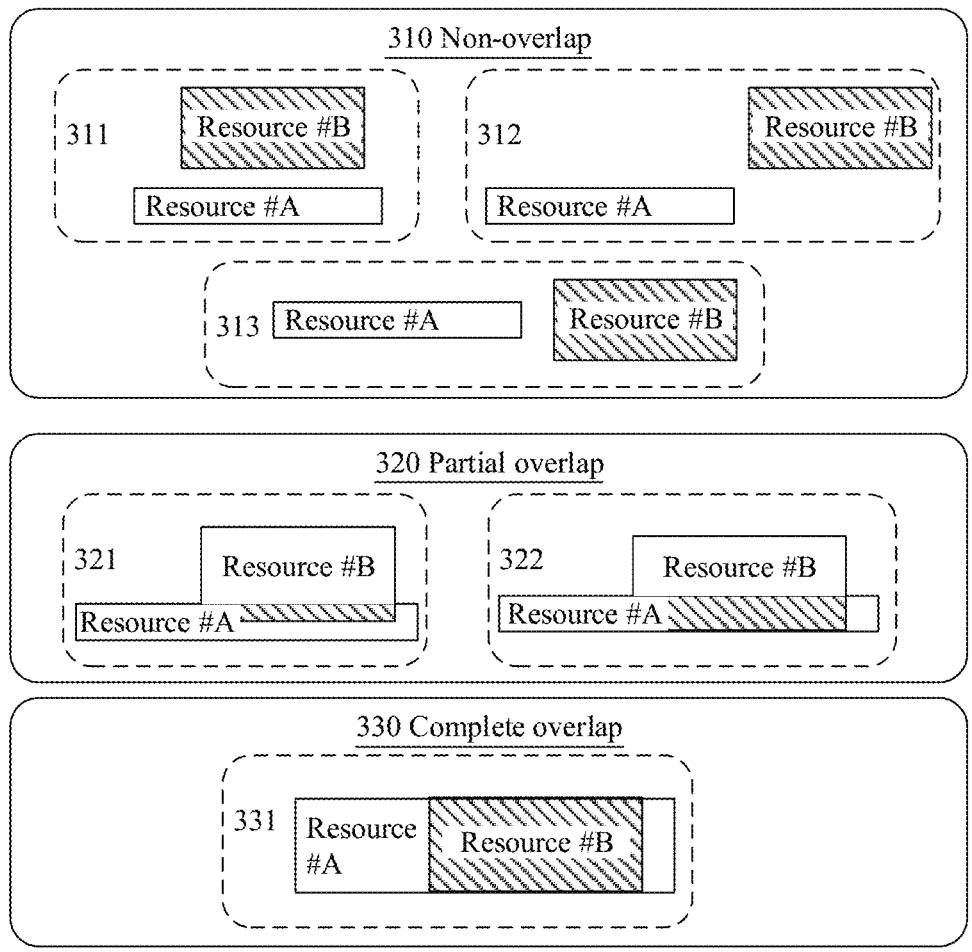
FIG. 3 is a schematic diagram of a resource in a communication method according to an embodiment of this application.

As shown in FIG. 3, a relative position relationship between resource #A and resource #B may include 310 non-overlap, 320 partial overlap, and 330 complete overlap.

As shown in 311, 312, and 313, the non-overlap of resource #A and resource #B may mean that resource #A and resource #B do not overlap at all in time domain or frequency domain. As shown in 321 and 322, the partial overlap of resource #A and resource #B may mean that resource #A and resource #B completely overlap in time domain but partially overlap in frequency domain. As shown in 331, the complete overlap of resource #A and resource #B may mean that resource #A and resource #B completely overlap in time domain and frequency domain.

In the embodiments of this application, the foregoing reserved resource may be a resource reserved in advance, or may be a resource that has been allocated to another terminal device.

For ease of description, in the embodiments of this application, a terminal device that uses the reserved resource is referred to as terminal device A, and a terminal device that subsequently performs data transmission is referred to as terminal device B.

Optionally, the foregoing reserved resource may be a resource reserved for the network device or terminal device A.

For example, the foregoing reserved resource may be a resource reserved by the network device for a physical random access channel (PRACH), a master system information block (MIB), a system information block (SIB), or the like.

In the embodiments of this application, the foregoing reserved resource can be used to carry a configured grant channel, that is, the reserved resource can be used to perform transmission in the configured grant manner.

Optionally, the foregoing reserved resource may be periodic. For example, the reserved resource may be a periodic resource reserved by the network device.

For example, the reserved resource may be a periodic resource occupied by terminal device A when performing transmission in the semi-persistent scheduling manner.

For another example, the reserved resource may be a resource occupied by terminal device A when performing transmission in the grant-free manner. Specifically, the reserved resource may be a dedicated resource that is configured by the network device for terminal device A and that is used when terminal device A performs URLLC transmission in the grant-free manner.

In the embodiments of this application, the foregoing reserved resource may be a narrowband (NB) resource.

In a possible implementation of this embodiment of this application, when scheduling terminal device B, the network device may not know that the reserved resource exists. In this case, a resource allocated by the network device to terminal device B may overlap with the reserved resource in time domain and frequency domain.

Optionally, the resource allocated by the network device to terminal device B can be used to carry a dynamic grant channel, that is, the resource can be used to perform transmission in the dynamic grant manner. Optionally, the resource allocated by the network device to terminal device B can be used to carry a configured grant channel.

Optionally, the resource allocated by the network device to terminal device B may be a periodic resource.

In the prior art, the network device can perform scheduling to avoid a conflict between the resource allocated to terminal device B and the reserved resource. However, this method causes heavy resource overheads to the network device, and imposes many restrictions on the scheduling of the network device, especially when there are many terminal devices in a system or the terminal device performs transmission frequently.

For example, in the NB-IoT system, to ensure good coverage, NPUSCH or NPDSCH transmission usually requires a large quantity of repetitions, resulting in a long transmission time. Therefore, there may be a large quantity of repetitions when terminal device B performs transmission.

In this case, it is difficult for the network device to well bypass the reserved resource when scheduling terminal device B, especially when the reserved resource is a periodic resource. Therefore, the scheduling of the system is greatly affected.

An embodiment of this application provides a communication method, so as to enable terminal device B to bypass a reserved resource in a system when transmitting data, thereby reducing scheduling complexity of the network device.

In addition, if a second resource is configured in a first system, and a terminal is scheduled to transmit a channel on a first resource in the first system, according to a first indication, the terminal does not use the second resource to transmit the channel, and therefore, the second resource can be allocated to a second system to use. For example, when a narrowband system (NB-IoT system) is embedded into a broadband system (NR) resource, the second resource is configured in the narrowband system so that the broadband system can use contiguous frequency resources at a time position of the second resource. In this way, embedding of the narrowband system does not cause frequency resources of the second system to be split. Further, second indication information may be used to implement flexible conversion and sharing of the second resource between the first system and the second system.

The following describes a communication method according to the embodiments of this application with reference to FIG. 2 to FIG. 11.

Figure 2:
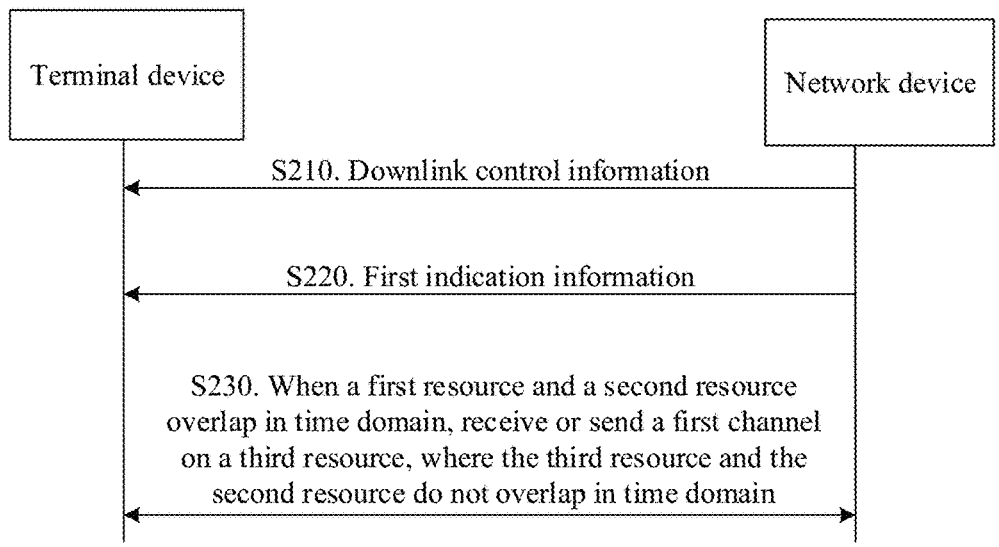
FIG. 2 is a schematic flowchart of a communication method according to an embodiment of this application.

FIG. 2 is an example flowchart of a communication method according to an embodiment of this application. The method includes the following steps.

When network device #A (that is, an example of a network device) determines that it needs to communicate with terminal device #B (that is, an example of a terminal device), a resource (that is, an example of a first resource) for communication may be allocated to terminal device #B from system resources (specifically, time-frequency resources) that can be used by network device #A. The allocated resource is denoted as resource #A in the following for ease of understanding and description.

In this application, resource #B (that is, an example of resource #B) exists in the system resources.

For example, resource #B may include a reserved resource in the system resources, and the reserved resource may be a resource that is prohibited from being used by some or all terminal devices (including terminal device #B) in the communications system.

For another example, resource #B may include a resource to be used by a neighboring cell of a cell provided by network device #A.

It should be noted that in this case, network device #A can obtain information about resource #B from network device #B that provides the neighboring cell.

For another example, resource #B may include a resource allocated by network device #A to terminal device #C.

For another example, resource #B may include a resource of the foregoing configured grant.

In this application, resource #A and resource #B may overlap in time domain.

"Resource #A and resource #B may overlap in time domain" may be understood as follows: Resource #A and resource #B may partially or completely overlap in time domain.

For example, a time domain range corresponding to resource #B includes a part of a time domain range corresponding to resource #A; or a time domain range corresponding to resource #A includes a part of a time domain range corresponding to resource #B; or a part of a time domain resource of resource #B overlaps with a part of a time domain resource of resource #A.

For another example, a time domain range corresponding to resource #B includes an entire time domain range corresponding to resource #A; or the entire resource #A in time domain overlaps with a part of resource #B in time domain.

For another example, a time domain range corresponding to resource #A includes an entire time domain range corresponding to resource #B; or a part of resource #B in time domain overlaps with the entire resource #A in time domain.

For another example, a time domain range corresponding to resource #A is totally the same as a time domain range corresponding to resource #B.

In addition, in this application, resource #A and resource #B may overlap in frequency domain.

"Resource #A and resource #B may overlap in frequency domain" may be understood as follows: Resource #A and resource #B may partially or completely overlap in frequency domain.

For example, a frequency domain range corresponding to resource #B includes a part of a frequency domain range corresponding to resource #A; or a frequency domain range corresponding to resource #A includes a part of a frequency domain range corresponding to resource #B; or a part of a frequency domain resource of resource #B overlaps with a part of a frequency domain resource of resource #A.

For another example, a frequency domain range corresponding to resource #B includes an entire frequency domain range corresponding to resource #A; or the entire resource #A in frequency domain overlaps with a part of resource #B in frequency domain.

For another example, a frequency domain range corresponding to resource #A includes an entire frequency domain range corresponding to resource #B; or a part of resource #B in frequency domain overlaps with the entire resource #A in frequency domain.

For another example, a frequency domain range corresponding to resource #A is totally the same as a frequency domain range corresponding to resource #B.

By way of example but not limitation, resource #A may be a narrowband resource or a broadband resource. This is not specifically limited in this application.

Optionally, resource #A may be a resource used in a dynamic grant manner.

It should be understood that the relationships between resource #A and resource #B listed above are merely examples for description, and this application is not limited thereto. For example, resource #A and resource #B may not overlap in time domain.

S210: Network device #A sends downlink control information #A (that is, an example of downlink control information) to terminal device #B.

The downlink control information may be used to indicate resource #A.

In this application, resource #A can be used to carry channel #A (that is, an example of a first channel).

For example, when channel #A is an uplink channel, data or information carried by channel #A may be determined by terminal device #B, or may be indicated by network device #A (for example, by using downlink control information #A).

When channel #A is a downlink channel, data or information carried by channel #A may be determined by network device #A. For example, the data or information carried by channel #A may be obtained from the network side (for example, a server or the Internet).

In this embodiment of this application, downlink control information #A may be DCI. Optionally, the downlink control information may include parameters such as a scheduling delay, a repetition quantity (repetition number), and a quantity of resource units (RU).

In this embodiment of this application, channel #A may be a dynamic grant channel, such as a PDSCH or a PUSCH.

It should be understood that the PDSCH herein may include a narrowband physical downlink shared channel (NPDSCH) and a machine type communication physical downlink shared channel (MTC Physical Downlink Shared Channel, MPDSCH).

Similarly, the PUSCH herein may include a narrowband physical uplink shared channel (NPUSCH) and a machine type communication physical uplink shared channel (MTC Physical Uplink Shared Channel, MPUSCH).

S220: Network device #A may send indication information (that is, an example of first indication information, which is denoted as information #1 in the following for ease of understanding and distinguishing) of resource #B to terminal device #B.

It should be noted that, in this embodiment of this application, an execution sequence of S210 and S220 is not limited.

For example, the network device may send the first indication information before sending the foregoing downlink control information, or the network device may send the first indication information after sending the foregoing downlink control information. Correspondingly, terminal device #B may receive the first indication information before receiving the foregoing downlink control information, or terminal device #B may receive the first indication information after receiving the foregoing downlink control information.

Specifically, the network device may send the first indication information during access of terminal device #B or initialization. Correspondingly, terminal device #B may receive the first indication information during access or initialization.

Alternatively, the network device may send the first indication information by using a MIB or a SIB. Correspondingly, terminal device #B may receive the first indication information by using a MIB or a SIB.

Alternatively, the network device may send the first indication information after sending the foregoing downlink control information, but before terminal device #B transmits the first channel. Correspondingly, terminal device #B may receive the first indication information after receiving the foregoing downlink control information but before transmitting the first channel.

The first indication information herein may be carried in the downlink control information in S210. In other words, the network device may add the first indication information to the downlink control information when sending the downlink control information. Correspondingly, terminal device #B may determine the first indication information based on the downlink control information after receiving the downlink control information.

Specifically, the first indication information may include a configuration parameter of resource #B, for example, an offset of resource #B in time domain or frequency domain, duration of resource #B in time domain, or a frequency band of resource #B in frequency domain.

Optionally, when resource #B is a periodic resource, the first indication information may further include a periodicity of resource #B.

In this embodiment of this application, the first indication information may indicate that the network device prohibits terminal device #B from using resource #B, or resource #B is unavailable for terminal device #B.

Resource #B may be a resource occupied when terminal device A performs transmission in a semi-persistent scheduling manner, or may be a resource occupied when terminal device A performs transmission in a grant-free manner.

Optionally, resource #B may be a resource occupied by a different system. For example, in a narrowband system (such as NB-IoT), the terminal is indicated that the first indication information is used to indicate the second resource, and resource #B is used to transmit a signal for a broadband system (such as NR).

Optionally, the first indication information may be used to indicate that terminal device #B is prohibited from using resource #B, or be used to indicate that terminal device #B cannot use resource #B.

As described above, when resource #A and resource #B overlap in time domain and frequency domain, if network device #A and terminal device #B still use resource #A to transmit channel #A, transmission of a channel carried on resource #B may be affected.

In this regard, S230: Network device #A and terminal device #B can determine resource #C, and transmit channel #A on resource #C.

In this application, the action of determining resource #C by terminal device #B may be triggered by terminal device #B based on a trigger condition specified by a communications system or a communications protocol.

By way of example but not limitation, the trigger condition may include: A resource (for example, resource #A) dynamically configured by the network device for the terminal device overlaps with another resource (that is, a resource allocated to another terminal device, a reserved resource, or the like, for example, resource #B) indicated by the network device in time domain.

Alternatively, the action of determining resource #C by terminal device #B may be triggered by terminal device #B based on trigger information (that is, second indication information) sent by the network device.

By way of example but not limitation, in this application, the trigger information can be used to indicate the terminal device to redetermine, when determining that the foregoing trigger condition is met, a resource used to carry the channel scheduled by the network device.

For example, after determining that the relationship between resource #A and resource #B meets the trigger condition (that is, resource #A and resource #B overlap in time domain), network device #A may send information #2 (that is, an example of the foregoing trigger information). Therefore, terminal device #B can start, based on the trigger information, a process of determining resource #C.

Information #2 may be carried in control information #A, or functions of control information #A and information #2 may be completed by using the same information.

Alternatively, information #2 may be carried in information #1, or functions of control information #1 and information #2 may be completed by using the same information.

For another example, network device #A may send information #3 (that is, another example of the trigger information) before allocating a resource to terminal device #B, so that terminal device #B and network device #A start, on their own after determining that the relationship between resource #A and resource #B meets the trigger condition, the action of determining resource #C.

Alternatively, information #3 may be carried in information #1, or functions of control information #1 and information #3 may be completed by using the same information.

By way of example but not limitation, the foregoing trigger information may be "0", which, in this case, may indicate that resource #B is available for terminal device #B; or the foregoing trigger information may be "1", which, in this case, may indicate that resource #B is unavailable for terminal device #B, or resource #B is prohibited from being used.

It should be noted that in this application, the methods for determining resource #C by network device #A and terminal device #B may be the same, that is, network device #A and terminal device #B can perform processing based on the same method, so that resources #C determined by both parties are the same.

Specifically, resource #C can meet the following condition:

Resource #C and resource #B do not overlap in time domain.

"Resource #C and resource #B do not overlap in time domain" may be understood as follows: Resource #C and resource #B do not fully overlap; or there is no overlap between resource #C and resource #B.

In this application, when resource #B and resource #C overlap, network device #A and terminal device #B can perform processing in any of the following manners.

It should be noted that in this application, to avoid a transmission error, it is necessary to ensure that network device #A can use the same processing method as terminal device #B. In this regard, in this application, the communications system or the communications protocol may specify the processing method for the network device and the terminal device, or the network device may determine a processing method on its own, and notify the terminal device of the determined processing method.

Manner 1: Postponed Transmission

First, conditions that need to be met by resource #C in manner 1 are described.

Figure 4:
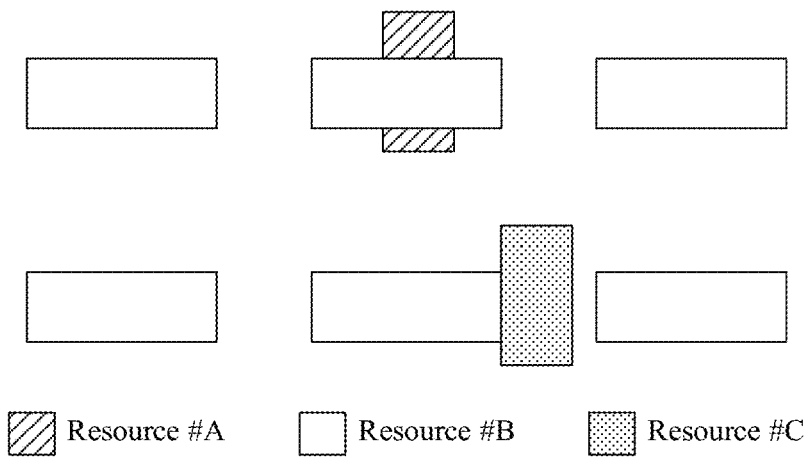
FIG. 4 is a schematic diagram of a resource in a communication method according to an embodiment of this application.

Case 1: As shown in FIG. 4, when a time domain range of resource #B includes an entire time domain range of resource #A, a time domain range of resource #C does not include the time domain range of resource #A, and the time domain range of resource #C does not include the time domain range of resource #B.

In this case, a size of resource #C may be greater than or equal to a size of resource #A.

For example, a time domain size of resource #C may be greater than or equal to a time domain size of resource #A.

In addition, in this case, for example, a frequency domain size of resource #C may be greater than or equal to a frequency domain size of resource #A, or a frequency domain size of resource #C may be smaller than a frequency domain size of resource #A, provided that the size of resource #C is greater than or equal to the size of resource #A.

For another example, a time domain size of resource #C may be smaller than or equal to a time domain size of resource #A.

In addition, in this case, for example, a frequency domain size of resource #C may be greater than a frequency domain size of resource #A, so as to ensure that the size of resource #C is greater than or equal to the size of resource #A.

In addition, it should be noted that, in this application, resource #C may be adjacent to resource #B in time domain, for example, resource #C may be located after resource #B. Alternatively, resource #C may be located before resource #B.

In addition, when resource #B is a periodic resource (or resource #B is a resource that appears periodically), resource #C may be located in time domain after a periodicity in which resource #B includes resource #A, and resource #C may be located in one or more periodicity gaps, where the periodicity gap may be a gap between two adjacent periodicities.

Figure 5:
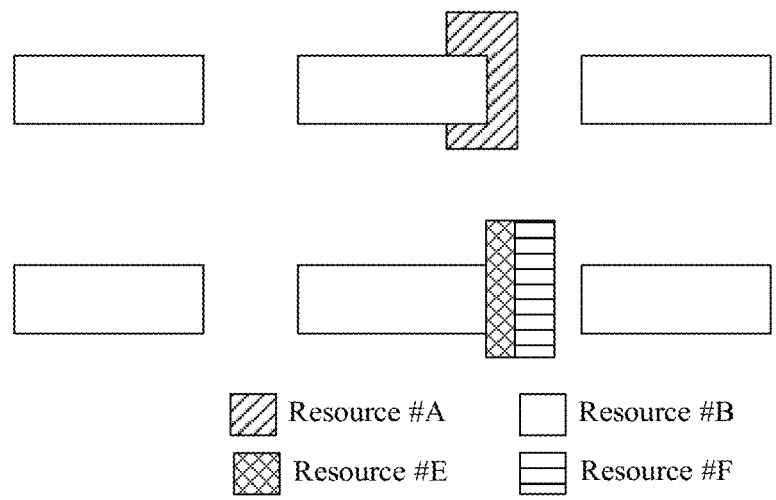
FIG. 5 is a schematic diagram of another resource in a communication method according to an embodiment of this application.
Figure 6:
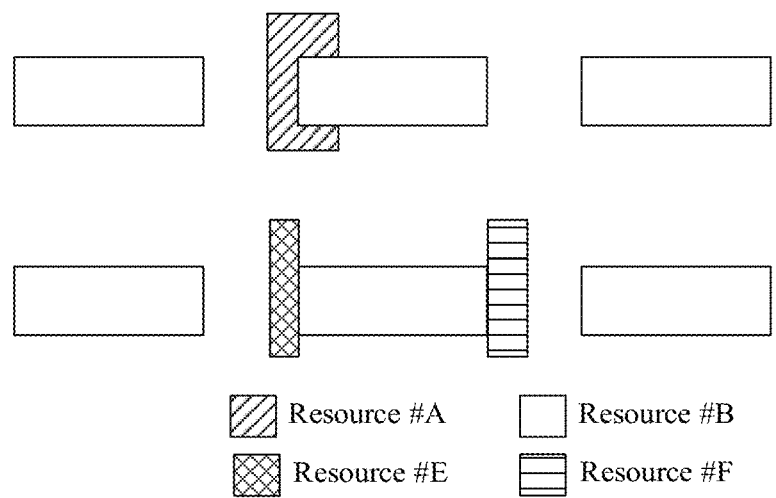
FIG. 6 is a schematic diagram of another resource in a communication method according to an embodiment of this application.
Figure 7:
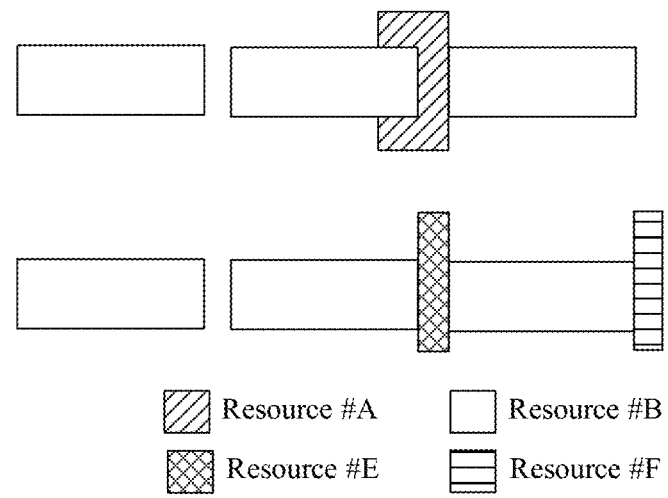
FIG. 7 is a schematic diagram of another resource in a communication method according to an embodiment of this application.

Case 2: As shown in FIG. 5 to FIG. 7, when a time domain range of resource #B includes a part of a time domain range of resource #A, in this case, a part that is of resource #A and that overlaps with resource #B is denoted as resource #D, and a part that is of resource #A and that does not overlap with resource #B is denoted as resource #E, then resource #C includes resource #F, a time domain range of resource #F does not include the time domain range of resource #A, the time domain range of resource #F does not include the time domain range of resource #B, and resource #C includes resource #E.

In this case, a size of resource #F may be greater than or equal to a size of resource #D.

For example, a time domain size of resource #F may be greater than or equal to a time domain size of resource #D.

In addition, in this case, for example, a frequency domain size of resource #F may be greater than or equal to a frequency domain size of resource #D, or a frequency domain size of resource #F may be smaller than a frequency domain size of resource #D, provided that the time domain size of resource #F is greater than or equal to the time domain size of resource #D.

For another example, a time domain size of resource #F may be smaller than or equal to a time domain size of resource #D.

In addition, in this case, for example, a frequency domain size of resource #F may be greater than a frequency domain size of resource #D, so as to ensure that the size of resource #F is greater than or equal to the size of resource #D.

In addition, it should be noted that, in this application, when an end moment of resource #B is later than an end moment of resource #D, resource #F may be adjacent to resource #B in time domain, for example, resource #F may be located after resource #B.

When an end moment of resource #E is later than an end moment of resource #B, resource #F may be adjacent to resource #E in time domain, for example, resource #F may be located after resource #E.

In addition, when resource #B is a periodic resource (or resource #B is a resource that appears periodically), resource #F may be located in time domain after a periodicity in which resource #B overlaps with resource #A in time domain, and resource #F may be located in one or more periodicity gaps.

The following describes data transmission on channel #A in manner 1.

In a possible implementation of this embodiment of this application, when a first resource conflicts with resource #B, terminal device #B may postpone receiving or sending a part that is of the first channel and that is mapped on a time-domain overlapping part of the first resource and resource #B. Correspondingly, the network device may postpone sending or receiving the part that is of the first channel and that is mapped on the time-domain overlapping part of the first resource and resource #B.

Mapping on the time-domain overlapping part of the first resource and resource #B may mean that the part of the first channel needs to be carried on the time-domain overlapping part of the first resource and resource #B; or may mean that the part of the first channel has already been carried on the time-domain overlapping part of the first resource and resource #B, but is not finally transmitted on the time-domain overlapping part of the first resource and resource #B.

Optionally, that the terminal device postpones receiving or sending the part that is of the first channel and that is mapped on the time-domain overlapping part of the first resource and resource #B may include: The terminal device postpones receiving or sending data, an information element, signaling, or the like that is of the first channel and that is mapped on the time-domain overlapping part of the first resource and resource #B. Correspondingly, that the network device postpones sending or receiving the part that is of the first channel and that is mapped on the time-domain overlapping part of the first resource and resource #B may include: The network device postpones sending or receiving data, an information element, signaling, or the like that is of the first channel and that is mapped on the time-domain overlapping part of the first resource and resource #B.

In this embodiment of this application, resource #C may include a part that is of the first resource and that does not overlap with resource #B in time domain. Optionally, the part that is of the first resource and that does not overlap with resource #B in time domain may be referred to as a first part, and the first part herein may be understood as a first part of resource #C.

Figure 8:
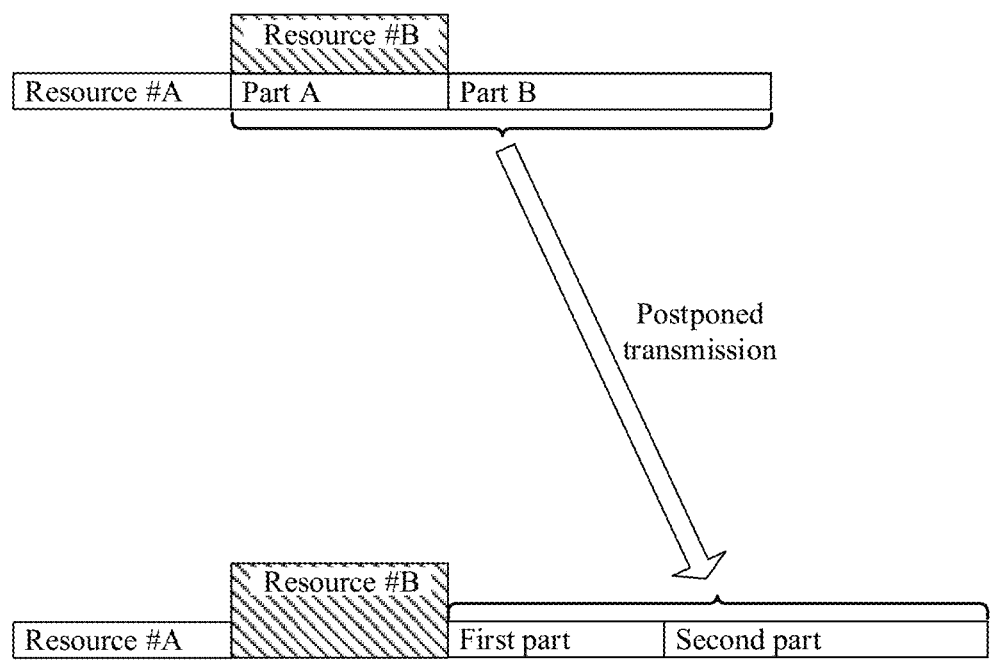
FIG. 8 is a schematic diagram of resource usage in a communication method according to an embodiment of this application.

Optionally, as shown in FIG. 8, the first part may be located after resource #B in time domain.

By way of example but not limitation, when resource #A and resource #B overlap in time domain, terminal device #B can perform receiving or sending on the first part. Correspondingly, the network device can perform sending or receiving on the first part.

In this case, terminal device #B cannot perform transmission on the part that is of the first resource and that overlaps with resource #B in time domain. However, to enable terminal device #B to completely transmit the first channel, as shown in FIG. 8, resource #C may further include a part that does not overlap with the first resource in time domain. As shown in FIG. 8, the part that does not overlap with the first resource in time domain may be referred to as a second part, and the second part herein may be understood as a second part of resource #C.

Optionally, to ensure that terminal device #B can completely receive or send the first channel, and correspondingly, the network device can completely send or receive the first channel, a time domain length of the second part may be greater than or equal to a time domain length of the time-domain overlapping part of the first resource and resource #B.

By way of example but not limitation, as shown in FIG. 8, the second part may be located after resource #B in time domain.

Optionally, the first part may be located before the second part in time domain, or the first part may be located after the second part in time domain. It should be understood that FIG. 8 is merely an example, and this application does not impose a limitation on relative positions of the first part and the second part in time domain.

In this embodiment of this application, that the first resource and resource #B overlap in time domain herein may include: The first resource and resource #B partially or completely overlap in time domain, and at the same time, the first resource and resource #B partially or completely overlap in frequency domain.

By way of example but not limitation, when the first resource and resource #B overlap in time domain, terminal device #B may perform receiving or sending on the first part and the second part that are located after resource #B in time domain; or terminal device #B may postpone receiving or sending a part that is of the first channel and that is mapped on the time-domain overlapping part and a frequency-domain overlapping part of the first resource and resource #B. Correspondingly, the network device can perform sending or receiving on the first part and the second part that are located after resource #B in time domain; or the network device may postpone sending or receiving the part that is of the first channel and that is mapped on the time-domain overlapping part and the frequency-domain overlapping part of the first resource and resource #B.

As shown in FIG. 8, part A may correspond to the second part, and part B may correspond to the first part.

Figure 9:
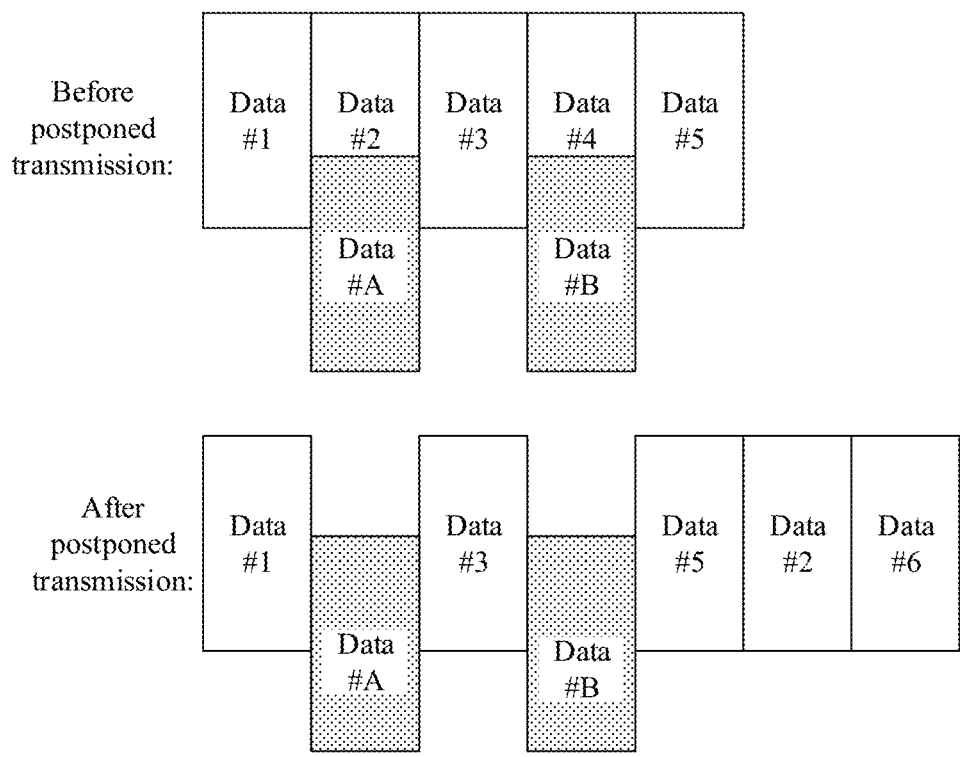
FIG. 9 is a schematic diagram of a resource in a communication method according to an embodiment of this application.
Figure 10:
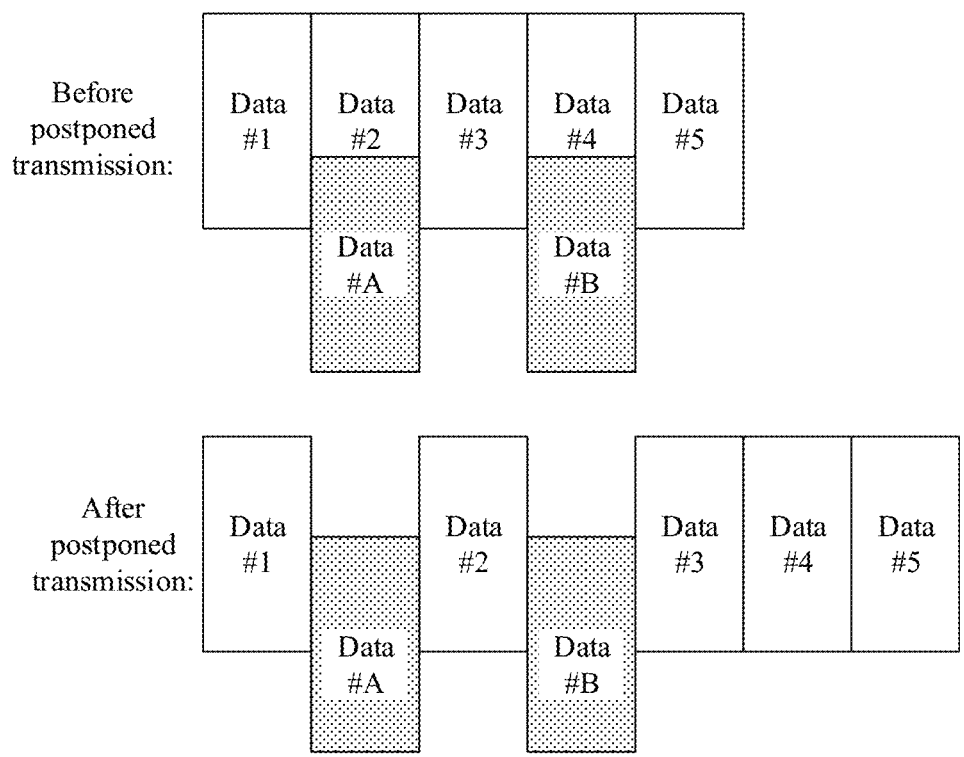
FIG. 10 is a schematic diagram of another resource in a communication method according to an embodiment of this application.

In a possible implementation, when part A of resource #A overlaps with resource #B, transmission may be performed in a previous order of data in part A and part B when the transmission is postponed. For example, as shown in FIG. 9 and FIG. 10, data sent sequentially in time domain for data #1 to data #5 on resource #A may be "12345", where data #2 may correspond to data "2", data #4 may correspond to data "4", and two adjacent resources #B in time domain may correspond to data #A and data #B. When data #2 and data #4 on resource #A overlap with data #A and data #B on resource #B, sending of data "2" and data "4" may be postponed. As shown in FIG. 9, in this case, an order of the data in time domain may be "1 23 526"; or as shown in FIG. 10, in this case, an order of the data in time domain may be "1 2 345".

Manner 2: Dropping

First, conditions that need to be met by resource #C in manner 2 are described.

When a time domain range of resource #B includes a part of a time domain range of resource #A, in this case, a part that is of resource #A and that overlaps with resource #B is denoted as resource #D, and a part that is of resource #A and that does not overlap with resource #B is denoted as resource #E; then resource #C is resource #E.

The following describes data transmission on channel #A in manner 2.

In manner 2, terminal device #B performs dropped transmission.

In a possible implementation of this embodiment of this application, when a first resource conflicts with resource #B, terminal device #B may drop a part that is of the first channel and that is mapped on a time-domain overlapping part of the first resource and resource #B. Correspondingly, the network device may also drop the part that is of the first channel and that is mapped on the time-domain overlapping part of the first resource and resource #B.

That terminal device #B drops the part that is of the first channel and that is mapped on the time-domain overlapping part of the first resource and resource #B may include: Terminal device #B drops data, an information element, signaling, or the like that is of the first channel and that is mapped on the time-domain overlapping part of the first resource and resource #B. Correspondingly, that the network device drops the part that is of the first channel and that is mapped on the time-domain overlapping part of the first resource and resource #B may include: The network device drops data, an information element, signaling, or the like that is of the first channel and that is mapped on the time-domain overlapping part of the first resource and resource #B.

In this embodiment of this application, resource #C may include a part that is of the first resource and that does not overlap with resource #B in time domain. Optionally, the part that is of the first resource and that does not overlap with resource #B in time domain may be referred to as a first part, and the first part herein may be understood as a first part of resource #C.

Figure 11:
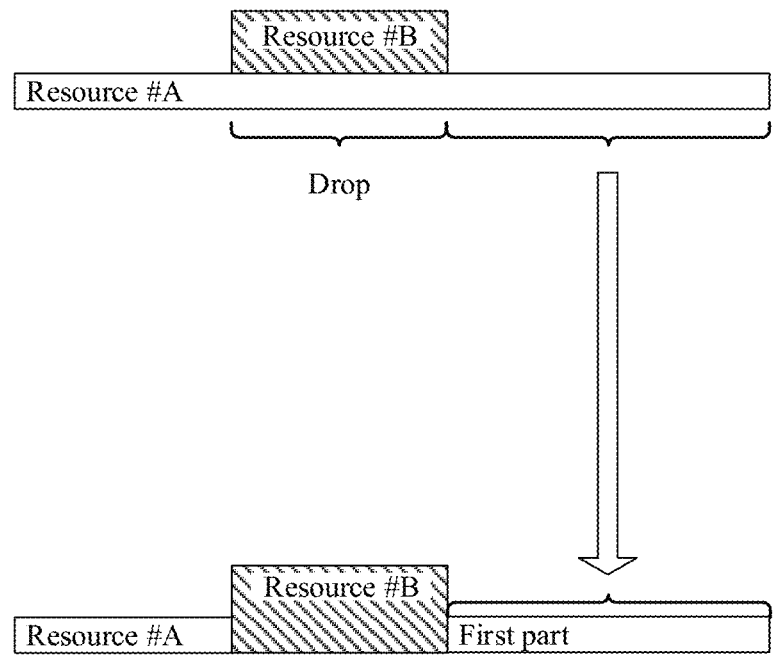
FIG. 11 is a schematic diagram of another resource usage in a communication method according to an embodiment of this application.

Optionally, as shown in FIG. 11, the first part may be located after resource #B in time domain.

By way of example but not limitation, when the first resource and resource #B overlap in time domain, terminal device #B may perform receiving or sending on the first part. Correspondingly, the network device may perform sending or receiving on the first part.

In this embodiment of this application, that the first resource and resource #B overlap in time domain herein may include: The first resource and resource #B partially or completely overlap in time domain, and at the same time, the first resource and resource #B partially or completely overlap in frequency domain.

Because terminal device #B cannot perform transmission on the part that is of the first resource and that overlaps with resource #B in time domain, terminal device #B cannot completely transmit the first channel.

By way of example but not limitation, terminal device #B may drop a part that is of the first channel and that is mapped on the time-domain overlapping part and a frequency-domain overlapping part of the first resource and resource #B. Correspondingly, the network device may drop the part that is of the first channel and that is mapped on the time-domain overlapping part and the frequency-domain overlapping part of the first resource and resource #B.

As shown in FIG. 11, part A may correspond to the second part, and part B may correspond to the first part.

In a possible implementation, when part A of resource #A overlaps with resource #B, data in part A may be dropped, or data that is in resource #A and that is in the last location in time domain may be dropped. For example, data sent sequentially in time domain for data #1 to data #5 on resource #A may be "12345", where data #2 may correspond to data "2", and data "2" corresponds to part A in resource #A. When part A corresponding to data "2" overlaps with resource #B, data "5" may be dropped, and in this case, the order of the sent data in time domain may be "1 234"; or data "2" may be dropped, and in this case, the order of the sent data in time domain may be "1 345".

By way of example but not limitation, when the first resource and resource #B overlap in time domain, the transmission of the first channel by terminal device #B on resource #C may include postponed transmission (postpone) and dropped transmission (drop).

In this embodiment of this application, the network device may indicate terminal device #B to perform postponed transmission or dropped transmission.

For example, the network device may indicate, by using downlink control information, terminal device #B to perform postponed transmission or dropped transmission, or the network device may indicate, by using first indication information, terminal device #B to perform postponed transmission or dropped transmission, or the network device may indicate, by using second indication information, terminal device #B to perform postponed transmission or dropped transmission.

Correspondingly, terminal device #B may determine, based on the downlink control information, to perform postponed transmission or dropped transmission, or terminal device #B may determine, according to the first indication information, to perform postponed transmission or dropped transmission, or terminal device #B may determine, according to the second indication information, to perform postponed transmission or dropped transmission.

For another example, the network device may configure, during system initialization or terminal device access, terminal device #B to perform postponed transmission or dropped transmission.

For another example, the network device may use the first indication information to indicate that resource #B is a postponed transmission resource or a dropped transmission resource. In this case, if resource #B is a postponed transmission resource, when a resource allocated to terminal device #B overlaps with resource #B in time domain, terminal device #B may perform postponed transmission; if resource #B is a dropped transmission resource, when a resource allocated to terminal device #B overlaps with resource #B in time domain, terminal device #B may perform dropped transmission.

Optionally, when resource #B is a postponed transmission resource, resource #B may be referred to as a postpone resource; when resource #B includes resources on a plurality of time domain segments, or resource #B is a periodic resource, resource #B may be referred to as a postpone resource set.

Similarly, when resource #B is a dropped transmission resource, resource #B may be referred to as a drop resource; when resource #B includes resources on a plurality of time domain segments, or resource #B is a periodic resource, resource #B may be referred to as a drop resource set.

Resource #B can be used to carry a configured grant channel, that is, may be a resource occupied when terminal device A performs transmission in a semi-persistent scheduling manner, or may be a resource occupied when terminal device A performs transmission in a grant-free manner.

It should be understood that the foregoing manner in which the network device configures or indicates the terminal device to perform postponed transmission or dropped transmission is merely an example of this embodiment of this application, and should not constitute any limitation on this embodiment of this application. This application does not exclude configuring or indicating the terminal device in other manners.

Figure 12:
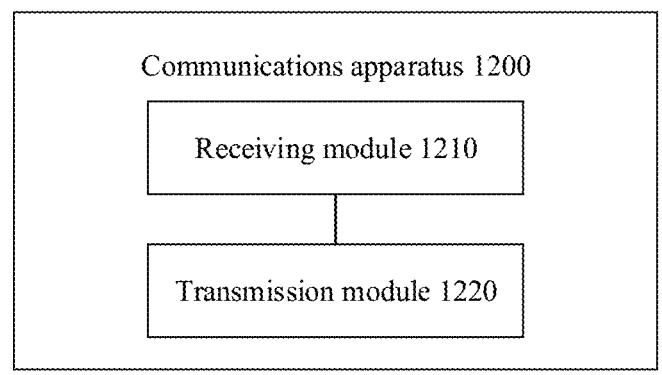
FIG. 12 is a schematic structural diagram of a communications apparatus according to an embodiment of this application.

FIG. 12 is a schematic block diagram of a communications apparatus 1200 according to an embodiment of this application. It should be understood that the communications apparatus 1200 is merely an example. The communications apparatus in this embodiment of this application may further include another module or unit, or include modules having functions similar to those of modules in FIG. 12, or does not need to include all the modules in FIG. 12.

A receiving module 1210 is configured to receive downlink control information, where the downlink control information is used to indicate a terminal device to transmit a first channel on a first resource.

The receiving module 1210 is further configured to receive first indication information, where the first indication information is used to indicate resource #B.

A transmission module 1220 is configured to receive or send the first channel on resource #C when the first resource and resource #B overlap in time domain, where resource #C and resource #B do not overlap in time domain.

Optionally, the transmission module is specifically configured to: receive or send the first channel on resource #C according to second indication information, where the second indication information is used to indicate that after the terminal device determines that a resource occupied by a channel scheduled by a network device overlaps with resource #B in time domain, the terminal device uses a resource that does not overlap with resource #B in time domain to transmit the channel scheduled by the network device.

Optionally, the second indication information is carried in the downlink control information, or the second indication information is carried in the first indication information.

Optionally, resource #C includes a first part that is of the first resource and that does not overlap with resource #B in time domain.

Optionally, resource #C includes a second part that does not overlap with the first resource in time domain.

Optionally, a time domain length of the second part is greater than or equal to a time domain length of a time-domain overlapping part of the first resource and resource #B.

Optionally, the transmission module is specifically configured to: drop a part that is of the first channel and that is mapped on the time-domain overlapping part of the first resource and resource #B.

Optionally, the transmission module is specifically configured to: postpone receiving or sending a part that is of the first channel and that is mapped on the time-domain overlapping part of the first resource and resource #B.

Optionally, resource #B is a resource allocated by the network device to a communications device other than the terminal device.

Optionally, the first channel includes a dynamic grant channel, and resource #B is used to carry a configured grant channel.

The communications apparatus 1200 may be configured to perform the steps performed by the terminal device in the communication method described in FIG. 2, and for brevity, details are not described herein again.

Figure 13:
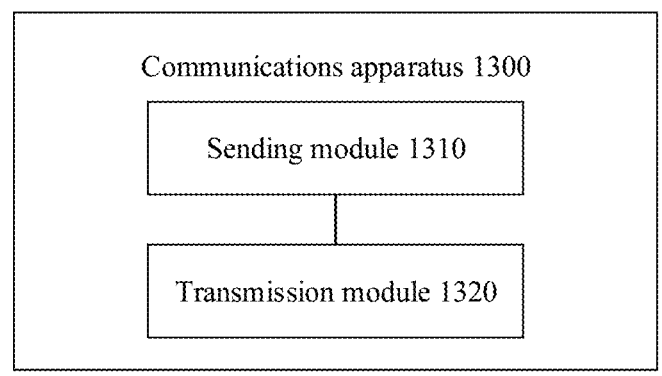
FIG. 13 is a schematic structural diagram of a communications apparatus according to an embodiment of this application.

FIG. 13 is a schematic block diagram of a communications apparatus 1300 according to an embodiment of this application. It should be understood that the communications apparatus 1300 is merely an example. The communications apparatus in this embodiment of this application may further include another module or unit, or include modules having functions similar to those of modules in FIG. 13, or does not need to include all the modules in FIG. 13.

A sending module 1310 is configured to send downlink control information, where the downlink control information is used to indicate a terminal device to transmit a first channel on a first resource.

The sending module 1310 is further configured to send first indication information, where the first indication information is used to indicate resource #B.

A transmission module 1320 is configured to receive or send the first channel on resource #C when the first resource and resource #B overlap in time domain, where resource #C and resource #B do not overlap in time domain.

Optionally, the transmission module is specifically configured to: receive or send the first channel on resource #C according to second indication information, where the second indication information is used to indicate that after the terminal device determines that a resource occupied by a channel scheduled by a network device overlaps with resource #B in time domain, the terminal device uses a resource that does not overlap with resource #B in time domain to transmit the channel scheduled by the network device.

Optionally, the second indication information is carried in the downlink control information, or the second indication information is carried in the first indication information.

Optionally, resource #C includes a first part that is of the first resource and that does not overlap with resource #B in time domain.

Optionally, resource #C includes a second part that does not overlap with the first resource in time domain.

Optionally, a time domain length of the second part is greater than or equal to a time domain length of a time-domain overlapping part of the first resource and resource #B.

Optionally, the transmission module is specifically configured to: drop a part that is of the first channel and that is mapped on the time-domain overlapping part of the first resource and resource #B.

Optionally, the transmission module is specifically configured to: postpone receiving or sending a part that is of the first channel and that is mapped on the time-domain overlapping part of the first resource and resource #B.

Optionally, resource #B is a resource allocated by the network device to a communications device other than the terminal device.

Optionally, the first channel includes a dynamic grant channel, and resource #B is used to carry a configured grant channel.

The communications apparatus 1300 may be configured to perform the steps performed by the network device in the communication method described in FIG. 2, and for brevity, details are not described herein again.

Figure 14:
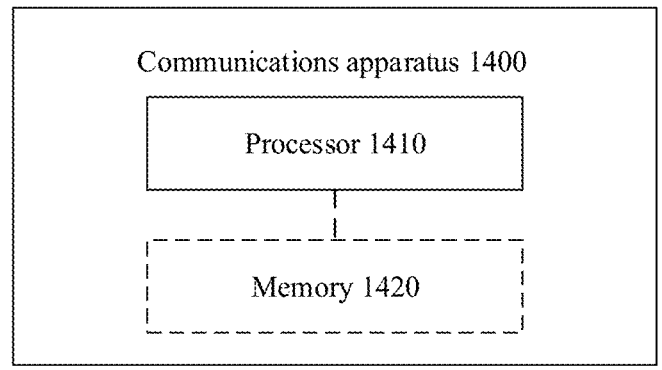
FIG. 14 is a schematic structural diagram of a communications apparatus according to another embodiment of this application.

FIG. 14 is a schematic structural diagram of a communications apparatus according to an embodiment of this application. It should be understood that a communications apparatus 1400 shown in FIG. 14 is merely an example. The communications apparatus in this embodiment of this application may further include another module or unit, or include modules having functions similar to those of modules in FIG. 14.

The communications apparatus 1400 may include a processor 1410, where the processor 1410 is configured to be coupled to a memory, and read and execute an instruction in the memory.

Optionally, the communications apparatus 1400 may further include the memory 1420. The memory 1420 is configured to store an instruction to be executed by the processor 1410.

In an embodiment, the processor 1410 executes the instruction in the memory to: receive downlink control information, where the downlink control information is used to indicate a terminal device to receive or send a first channel on a first resource; receive first indication information, where the first indication information is used to indicate resource #B; when the first resource and resource #B overlap in time domain, receive or send the first channel on resource #C, where resource #C and resource #B do not overlap in time domain.

Optionally, the processor may be specifically configured to: receive or send the first channel on resource #C according to second indication information, where the second indication information is used to indicate that after the terminal device determines that a resource occupied by a channel scheduled by a network device overlaps with resource #B in time domain, the terminal device uses a resource that does not overlap with resource #B in time domain to receive or send the channel scheduled by the network device.

Optionally, the second indication information is carried in the downlink control information, or the second indication information is carried in the first indication information.

Optionally, resource #C includes a part that is of the first resource and that does not overlap with resource #B in time domain.

Optionally, resource #C includes a part that does not overlap with the first resource in time domain.

Optionally, a time domain length of the second part is greater than or equal to a time domain length of a time-domain overlapping part of the first resource and resource #B.

Optionally, the processor may be specifically configured to: drop a part that is of the first channel and that is mapped on the time-domain overlapping part of the first resource and resource #B.

Optionally, the processor may be specifically configured to: postpone receiving or sending the part that is of the first channel and that is mapped on the time-domain overlapping part of the first resource and resource #B.

Optionally, resource #B is a resource allocated by the network device to a communications device other than the terminal device.

Optionally, the first channel includes a dynamic grant channel, and resource #B is used to carry a configured grant channel.

Optionally, the communications apparatus 1400 may further include a transceiver, for example, when the communications apparatus 1400 is a terminal device. The transceiver may be configured to perform the steps that can be performed by the receiving module 1210 and the transmission module 1220 in FIG. 12. For brevity, details are not described herein again.

Optionally, the communications apparatus 1400 may further include a communications interface, for example, when the communications apparatus 1400 is a chip that can be integrated into a terminal device. The communications interface may be configured to perform the operations that can be performed by the receiving module 1210 and the transmission module 1220 in FIG. 12. For brevity, details are not described herein again.

In another embodiment, the processor 1410 executes the instruction in the memory to: send downlink control information, where the downlink control information is used to indicate a terminal device to send or receive a first channel on a first resource; send first indication information, where the first indication information is used to indicate resource #B; when the first resource and resource #B overlap in time domain, send or receive the first channel on resource #C, where resource #C and resource #B do not overlap in time domain.

Optionally, the processor 1410 may be specifically configured to: send or receive the first channel on resource #C according to second indication information, where the second indication information is used to indicate that after the terminal device determines that a resource occupied by a channel scheduled by a network device overlaps with resource #B in time domain, the terminal device uses a resource that does not overlap with resource #B in time domain to receive or send the channel scheduled by the network device.

Optionally, the second indication information is carried in the downlink control information, or the second indication information is carried in the first indication information.

Optionally, resource #C includes a first part that is of the first resource and that does not overlap with resource #B in time domain.

Optionally, resource #C includes a second part that does not overlap with the first resource in time domain.

Optionally, a time domain length of the second part is greater than or equal to a time domain length of a time-domain overlapping part of the first resource and resource #B.

Optionally, the processor may be specifically configured to: drop a part that is of the first channel and that is mapped on the time-domain overlapping part of the first resource and resource #B.

Optionally, the processor may be specifically configured to: postpone sending or receiving the part that is of the first channel and that is mapped on the time-domain overlapping part of the first resource and resource #B.

Optionally, resource #B is a resource allocated by the network device to a communications device other than the terminal device.

Optionally, the first channel includes a dynamic grant channel, and resource #B is used to carry a configured grant channel.

Optionally, the communications apparatus 1400 may further include a transceiver, for example, when the communications apparatus 1400 is a network device. The transceiver may be configured to perform the steps that can be performed by the sending module 1310 and the transmission module 1320 in FIG. 13. For brevity, details are not described herein again.

Optionally, the communications apparatus 1400 may further include a communications interface, for example, when the communications apparatus 1400 is a chip that can be integrated into a network device. The communications interface may be configured to perform the operations that can be performed by the sending module 1310 and the transmission module 1320 in FIG. 13. For brevity, details are not described herein again.

In related studies, when a narrowband system (for example, an NB-IoT system) is embedded into a broadband system (for example, an NR system), the narrowband system occupies a part of a bandwidth of the broadband system in frequency domain (for example, the NB-IoT system occupies one or more physical resource blocks (PRB)). This splits a frequency spectrum of the broadband system in frequency domain, and consequently, the broadband system cannot use contiguous frequency domain resources. Especially for a case in which an uplink of the broadband system is single-carrier frequency-division multiple access (SC-FDMA), when the narrowband system is embedded into the broadband system in frequency domain, and a signal mapped to a resource of the narrowband system is punctured in the uplink of the broadband system, a single-carrier characteristic of SC-FDMA of the broadband system may be damaged.

Figure 15:
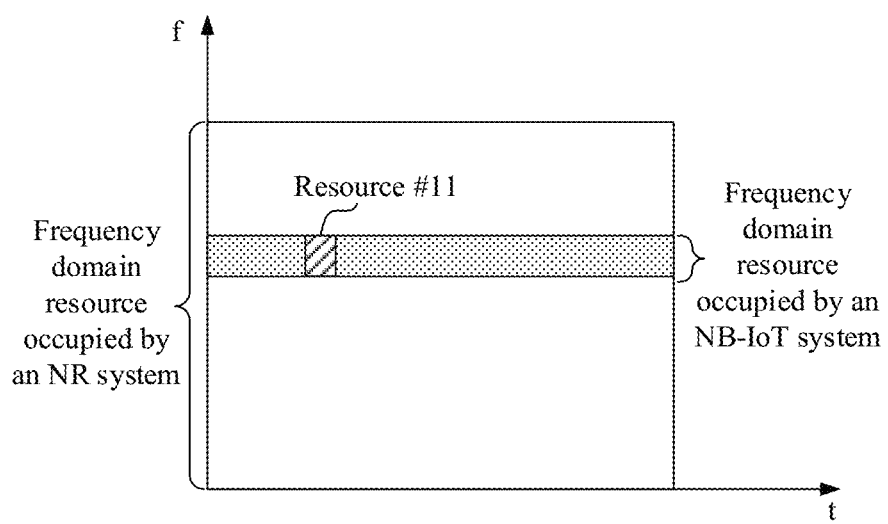
FIG. 15 is a schematic diagram of an NB-IoT system embedded into an NR system.

To prevent the narrowband system from splitting the broadband system in frequency domain, the narrowband system may reserve a resource for the broadband system to use. The following provides a further description with reference to the accompanying drawings and based on specific examples. FIG. 15 is a schematic diagram of an NB-IoT system embedded into an NR system, where a horizontal coordinate represents time and a vertical coordinate represents a frequency. In FIG. 15, after the NB-IoT system is embedded into the NR system, the NB-IoT system occupies a part of broadband (for example, one PRB) corresponding to the NR system. This may split the NR system in frequency domain and affect transmission performance of the NR system. To avoid the foregoing problems, the NB-IoT system may reserve a resource for the NR system to use, such as resource #11 in FIG. 15. Resource #11 is originally a resource of the NB-IoT system, but the NB-IoT system does not use the resource. Instead, resource #11 is reserved for the NR system, and the NR system can use resource #11, so that the NR system can use contiguous frequency domain resources. In this way, embedding of the NB-IoT system does not cause frequency resources of the NR system to be split.

However, in this case, a new problem may be further brought. A network device of the broadband system may not know related information about the reserved resource. As a result, the network device of the broadband system cannot use the reserved resource, causing a waste of resources. In addition, the related information about the reserved resource may further change over time, but the network device of the broadband system may not know the change, either. This may cause mutual interference.

Based on the foregoing situation, this application further provides a communication method 300, so as to improve utilization efficiency of resources and avoid a waste of resources, and further avoid mutual interference.

Figure 16:
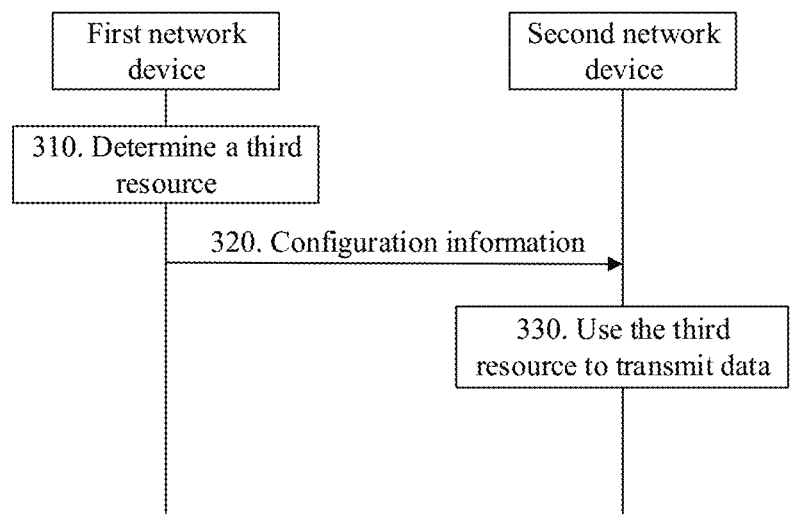
FIG. 16 is a schematic flowchart of another example of a communication method according to an embodiment of this application.

FIG. 16 is a schematic flowchart of a communication method 300 according to this application. The following describes the communication method 300 according to an embodiment of this application with reference to FIG. 16. The method 300 includes the following steps.

Step 310: A first network device determines a third resource.

Step 320: The first network device sends configuration information to a second network device, where the configuration information is used to indicate the third resource.

Correspondingly, in step 320, the second network device receives the configuration information sent by the first network device.

Step 330: The second network device uses the third resource to transmit data.

The first network device is a network device belonging to a first system, the second network device is a network device belonging to a second system, there is an overlapping part between a frequency domain resource occupied by the first system and a frequency domain resource occupied by the second system, and the third resource is located in the overlapping part and is a resource reserved by the first system for the second system.

Specifically, the first network device (for example, an eNB) is a network device belonging to the first system, and the second network device (for example, a gNB) is a network device belonging to the second system. In this embodiment of this application, the first system and the second system may be different systems.

Specifically, the "system" mentioned in this application mainly is a communications system, and the first system and the second system are different communications systems. For example, the first system may be a narrowband Internet of things (NB-IoT) system, and the second system may be a communications system, for example, an NR system, different from the first system. Alternatively, the first system is a machine type communication (MTC) system, and the second system is a communications system, for example, an NR system, different from the first system.

Optionally, the first system may be a narrowband system, the second system may be a broadband system, and the narrowband system may be embedded into the broadband system.

Optionally, the first system may be an NB-IoT system or an MTC system.

In other words, the narrowband system may be an NB-IoT system, and a bandwidth of the narrowband system in this case may be one PRB. It can also be understood that a transmission bandwidth of the narrowband system in this case is one PRB, that is, 180 kHz, which may include twelve 15-kHz subcarriers or forty-eight 3.75-kHz subcarriers. Alternatively, it can be understood that a carrier bandwidth of NB-IoT is one PRB, that is, 180 kHz. In addition, NB-IoT can also support a multi-carrier operation, that is, a terminal can transmit data on different carriers. In addition, it can also be understood that a channel bandwidth of the NB-IoT system is 200 kHz.

Alternatively, the narrowband system may be an MTC system, and a bandwidth of the narrowband system in this case is six PRBs. It can be understood that the transmission bandwidth of the narrowband system is six PRBs. Alternatively, it can be understood that the channel bandwidth of the narrowband system is 1.4 MHz, in which there are six PRBs that can be used for data transmission. It should be understood that in the narrowband system, when UE is in a connected state, a PDSCH or a PUSCH with a larger bandwidth (for example, 24 PRBs or 96 PRBs) may alternatively be used to transmit data.

Optionally, the second system may be any one of an NR system, an LTE system, an LTE-advanced system, and the like.

In other words, the broadband system may be an NR system. In this case, the bandwidth of the broadband system may be 106 PRBs, 133 PRBs, 270 PRBs, or another quantity of PRBs, which is not limited herein. It should be understood that the bandwidth of the broadband system can also be understood as a maximum transmission bandwidth. For example, the maximum transmission bandwidth is 106 PRBs, and the channel bandwidth in this case is 20 MHz.

Alternatively, the broadband system may be an LTE system. In this case, the bandwidth of the broadband system may be 50 PRBs, 100 PRBs, or another quantity of PRBs, which is not limited herein. It should be understood that the "bandwidth" mentioned in this application can be understood as a transmission bandwidth.

Optionally, the first system and the second system may alternatively be both narrowband systems.

For example, the first system may be an NB-IoT system, and the second system may be an MTC system.

In this embodiment of this application, the "overlapping part" mainly refers to an overlap in frequency domain. That there is an overlapping part between a frequency domain resource occupied by the first system and a frequency domain resource occupied by the second system may alternatively be understood as follows: There is an overlapping part between a frequency domain resource that can be used by the first system for communication and a frequency domain resource that can be used by the second system for communication.

Optionally, that there is an overlapping part between a frequency domain resource occupied by the first system and a frequency domain resource occupied by the second system may also be understood as follows: There is an overlapping part between an operating frequency band occupied by the first system and an operating frequency band occupied by the second system.

Optionally, the frequency domain resource occupied by the first system may be understood as contiguous frequency domain resources or non-contiguous frequency domain resources occupied by the first system. This is not specifically limited in this application.

Optionally, the frequency domain resource occupied by the second system may be understood as contiguous frequency domain resources or non-contiguous frequency domain resources occupied by the second system. This is not specifically limited in this application.

In this embodiment of this application, the first network device determines the third resource (specifically, a time-frequency resource), where the third resource is located in the overlapping part and is a resource reserved by the first system for the second system.

Specifically, the resource located in the overlapping part can be used by the first system, or used by the second system, or used by neither of the first system and the second system. In this embodiment of this application, the third resource is located in the overlapping part and is a resource reserved by the first system for the second system. It should be understood that the resource reserved by the first system for the second system is a resource that can be used by the second system. A specific using method and a specific terminal, in the second system, that uses the resource depend on specific implementation. This is not limited in this application.

Optionally, the third resource may be a resource reserved in advance by the first system.

Optionally, the third resource may be a resource that is not used by the first system. For example, the third resource may be a resource that is prohibited from being used by a specific terminal or all terminal devices in the first system (in other words, the third resource is an invalid resource for a specific terminal or all the terminal devices in the first system).

Optionally, the third resource may be a resource belonging to the first system, and is a resource that is not used by the first system but reserved for the second system to use.

FIG. 15 is used as an example. The first system may be an NB-IoT system, the second system may be an NR system, and the third resource may include resource #11 shown in FIG. 15. Resource #11 is a resource belonging to the NB-IoT system, and resource #11 is not used by the NB-IoT system, but is reserved for the NR system to use.

The following further describes the third resource by using an example in which the first system is an NB-IoT system and the second system is an NR system.

The NB-IoT system supports a multi-carrier operation. Therefore, a frequency domain resource occupied by the NB-IoT system may include an anchor carrier and/or a non-anchor carrier of the NB-IoT system. The terminal device in the NB-IoT system may perform data transmission on the anchor carrier or the non-anchor carrier at the same time.

For the NB-IoT system in frequency division duplexing (FDD) mode, a carrier that carries a narrowband primary synchronization signal (NPSS), a narrowband secondary synchronization signal (NSSS), a narrowband physical broadcast channel (NPBCH), and a system information block 1-narrowband (SIB1-NB) is an anchor carrier, and the foregoing content can camp on the anchor carrier.

To share pressure of the service of massive connections for Internet of things, an operation of the non-anchor carrier is introduced into NB-IoT. In a radio resource control (RRC) connected state, the terminal device can be configured on a PRB different from the anchor carrier through RRC signaling, where the PRB is referred to as a non-anchor carrier. The non-anchor carrier may not carry the NPSS, the NSSS, the NPBCH, and the SIB1-NB.

For the NB-IoT system in time division duplexing (TDD) mode, the carrier that carries the NPSS, the NSSS, and the NPBCH may be an anchor carrier. The carrier that does not carry the NPSS, the NSSS, and the NPBCH may be a non-anchor carrier.

In this embodiment of this application, the third resource may be located on the anchor carrier, or may be located on the non-anchor carrier, or may be located on both the anchor carrier and the non-anchor carrier. This is not limited in this application.

Figure 17:
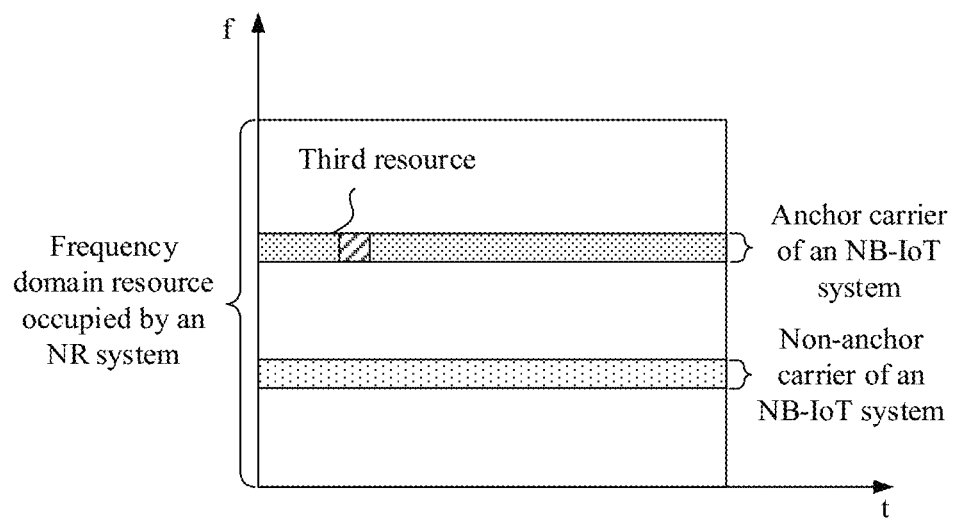
FIG. 17 is a schematic diagram of a third resource located on an anchor carrier.

FIG. 17 is a schematic diagram of a third resource located on an anchor carrier.

In FIG. 17, the NB-IoT system includes an anchor carrier and a non-anchor carrier. In other words, the frequency domain resource occupied by the NB-IoT system includes the anchor carrier and the non-anchor carrier. Further, the NB-IoT system can be embedded into the NR system, the anchor carrier and the non-anchor carrier constitute the overlapping part of the frequency domain resources occupied by the foregoing two systems, and the third resource may be located on the anchor carrier of the NB-IoT system.

Figure 18:
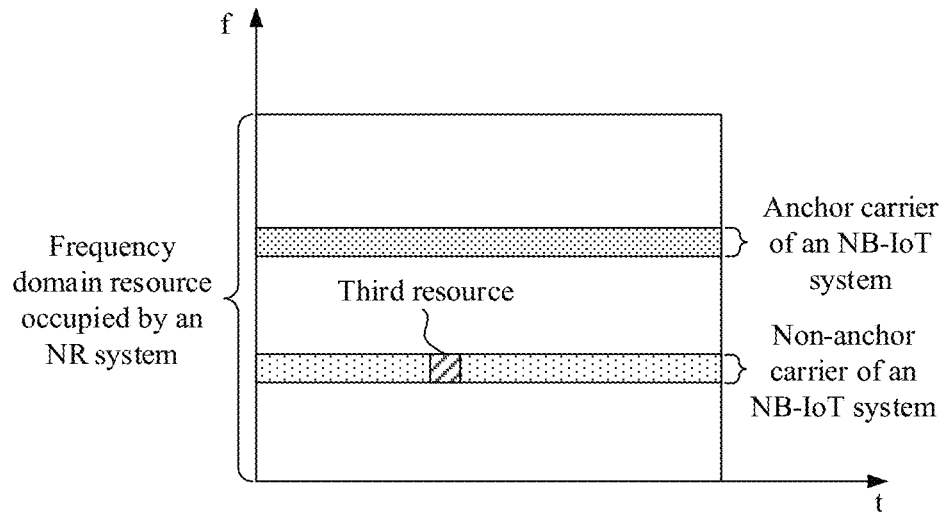
FIG. 18 is a schematic diagram of a third resource located on a non-anchor carrier.

FIG. 18 is a schematic diagram of a third resource located on a non-anchor carrier. Different from the embodiment shown in FIG. 17, in FIG. 18, the third resource may alternatively be located on the non-anchor carrier of the NB-IoT system.

Figure 19:
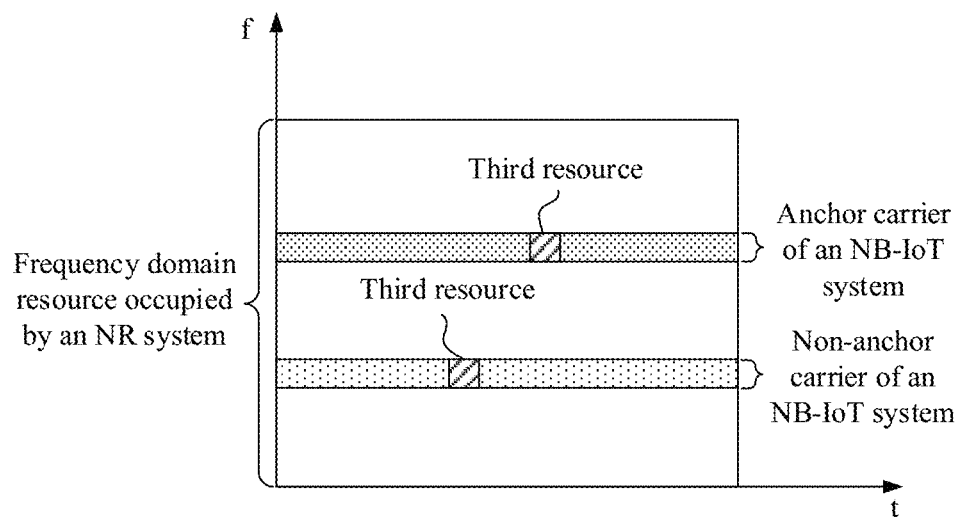
FIG. 19 is a schematic diagram of a third resource located on both an anchor carrier and a non-anchor carrier.

FIG. 19 is a schematic diagram of a third resource located on both an anchor carrier and a non-anchor carrier.

Different from the embodiments shown in FIG. 17 and FIG. 18, in FIG. 19, the third resource may include a resource located on both the anchor carrier and the non-anchor carrier of the NB-IoT system.

It should be understood that the foregoing embodiments shown in FIG. 17 to FIG. 19 are merely examples, and do not constitute any limitation on this application. For example, in other embodiments, the NB-IoT system may not include the non-anchor carrier, but only the anchor carrier.

For another example, in other embodiments, the NB-IoT system may alternatively include a plurality of non-anchor carriers, and the third resource may include resources arbitrarily distributed on the anchor carrier and at least one of the plurality of non-anchor carriers.

In other implementations, the first system may alternatively be an MTC system, the second system may be an NR system, and the MTC system may be embedded into the NR system.

Further, the third resource may be a resource reserved by the MTC system for the NR system to use.

It should be understood that there may be no definition of the anchor carrier and the non-anchor carrier in the MTC system, and therefore an indication of the frequency domain information of the third resource may be different from that in the NB-IoT system. For example, it may be indicated that the third resource is located on one or more PRBs of the MTC system. This is not limited in this application.

In this embodiment of this application, after determining the third resource, the first network device sends the configuration information to the second network device, where the configuration information is used to indicate the third resource. In other words, the second network device can determine the third resource based on the configuration information.

Optionally, the configuration information may include time domain information of the third resource.

Optionally, the configuration information may include frequency domain information of the third resource.

For example, the configuration information may include a start position of the third resource in time domain or frequency domain, an offset of the third resource in time domain or frequency domain, duration of the third resource in time domain, a bandwidth of the third resource in frequency domain, and the like. This is not limited in this application.

For another example, the third resource may alternatively be a periodic resource, that is, the third resource is a resource that appears periodically, and the configuration information may alternatively include periodicity information of the third resource.

With reference to the embodiment shown in FIG. 17, the third resource may be located on the anchor carrier of the NB-IoT system, and the configuration information may include the time domain information of the third resource.

Optionally, the configuration information may include the time domain information of the third resource, but not the frequency domain information of the third resource, thereby reducing signaling overheads.

Optionally, the first network device may exchange the frequency domain information of the third resource with the second network device in advance, that is, before receiving the configuration information, the second network device has obtained the frequency domain information of the third resource.

Optionally, the frequency domain information of the third resource may be carried in another message instead of the configuration information, that is, the time domain information and the frequency domain information of the third resource may be sent separately.

Optionally, the configuration information may include the time domain information and the frequency domain information of the third resource.

Optionally, the frequency domain information of the third resource may include radio frequency channel number information of the anchor carrier.

With reference to the embodiment shown in FIG. 18, the third resource may alternatively be located on the non-anchor carrier of the NB-IoT system, and the configuration information may include the time domain information and the frequency domain information of the third resource.

Optionally, the frequency domain information of the third resource may include radio frequency channel number information of the non-anchor carrier.

Optionally, the frequency domain information of the third resource may further include an index of a PRB or index information of a PRB.

Optionally, for the NB-IoT system in FDD mode, the radio frequency channel number information of the anchor carrier or the non-anchor carrier may include an evolved-universal terrestrial radio access absolute radio frequency channel number (evolved-universal terrestrial radio access (E-UTRA) absolute radio frequency channel number, EARFCN) and an offset channel number of the EARFCN (offset of channel number to EARFCN).

Optionally, for the NB-IoT system in TDD mode, the radio frequency channel number information of the anchor carrier or the non-anchor carrier may include the EARFCN, the offset channel number of the EARFCN, and offsets of center absolute radio frequency channel numbers of uplink and downlink carriers (that is, TDD-UL-DL-AlignmentOffset-NB).

In comparison with exchange of the offset channel number of the UL EARFCN, exchange of the TDD-UL-DL-AlignmentOffset-NB is implemented in this application, thereby avoiding an incorrect UL PRB due to exchange of an incorrect offset channel number of the UL EARFCN between network devices.

It should be understood that the foregoing manner of exchanging radio frequency channel number information of the anchor carrier or the non-anchor carrier can alternatively be used independently, without depending on the current embodiment.

In other words, in other possible application scenarios, for the NB-IoT system in TDD mode, when the radio frequency channel number information of the anchor carrier or the non-anchor carrier needs to be exchanged, the radio frequency channel number information may also include the EARFCN, the offset channel number of the EARFCN, and the TDD-UL-DL-AlignmentOffset-NB, thereby avoiding an incorrect UL PRB due to exchange of an incorrect offset channel number of the UL EARFCN between network devices. In this embodiment, the time domain information of the third resource may be indicated by a bitmap.

After determining the third resource, the first network device may send the configuration information to the second network device, where the configuration information includes a bitmap, and the second network device may determine the time domain information of the third resource by using the bitmap. For example, the second network device may determine a subframe, slot, or symbol on which the third resource is located, or may determine, by using the bitmap, that a resource on which subframe, slot, or symbol is the third resource.

The system or the protocol may specify that, or the first network device and the second network device may agree that, each bit may correspond to a resource of a specific size. For example, each bit may correspond to one subframe, one slot, or one symbol, or a plurality of subframes, a plurality of slots, or a plurality of symbols. "0" or "1" in a corresponding bit is used to indicate whether a resource at a corresponding position is the third resource.

It should be understood that the "protocol" in this embodiment of this application may be a standard protocol in the communications field, for example, may include an LTE protocol, an NR protocol, and a related protocol applied to a future communications system. This is not limited in this application.

The following uses specific examples to further describe a case in which the time domain information of the third resource is indicated by a bitmap. It should be understood that the following embodiments are merely examples, and do not constitute any limitation on this application.

Figure 20:
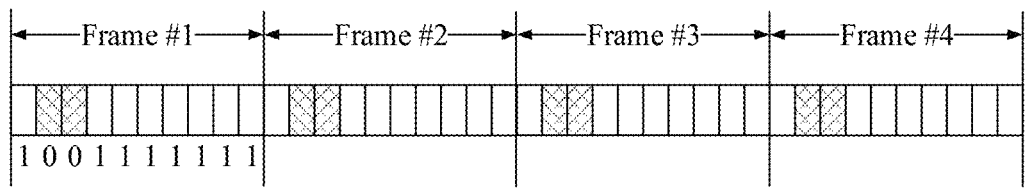
FIG. 20 is a schematic diagram of an example in which time domain information of a third resource is indicated by a bitmap.

FIG. 20 is a schematic diagram of an example in which time domain information of a third resource is indicated by a bitmap.

In FIG. 20, a length of the bitmap may be 10 bits, and the time domain information of the third resource is indicated periodically. "1" indicates that a subframe (resource) at a corresponding position is not the third resource.

In other words, "1" indicates that a subframe at the corresponding position can be used by the first network device, or can be used by the first system, or can be used by the terminal device of the first system, or indicates that the subframe is a valid subframe for the terminal device of the first system.

"0" indicates that a subframe (resource) at a corresponding position is the third resource, that is, a resource at the corresponding position is a resource reserved by the first system for a second system to use.

In other words, "0" indicates that a subframe at the corresponding position cannot be used by the first network device, or cannot be used by the first system, or cannot be used by the terminal device of the first system, or indicates that the subframe is an invalid subframe for the terminal device of the first system.

It should be understood that the foregoing description is merely an example. In other implementations, alternatively, "1" can be used to indicate that the subframe (resource) at the corresponding position is the third resource, and "0" indicates that the subframe (resource) at the corresponding position is not the third resource. This is not limited in this application.

It should be understood that the foregoing "invalid subframe" should be understood as meaning that there is no signal of the first system on the subframe, and the first system does not use the subframe.

In FIG. 20, the bitmap can periodically indicate the time domain information of the third resource. For example, a 10-bit bitmap 1001111111 not only can indicate the third resource in frame #1, but also can be used to indicate the third resource in frame #2, frame #3, and frame #4, thereby reducing signaling overheads.

Figure 21:
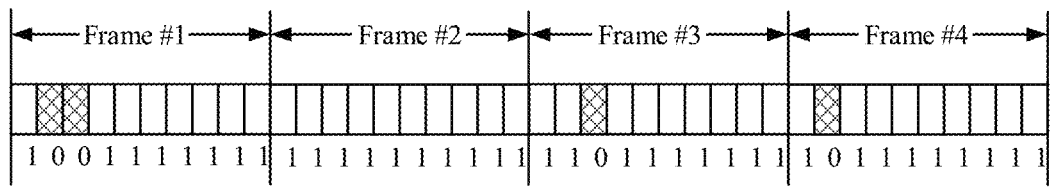
FIG. 21 is a schematic diagram of another example in which time domain information of a third resource is indicated by a bitmap.

FIG. 21 is a schematic diagram of another example in which time domain information of a third resource is indicated by a bitmap.

In FIG. 21, the bitmap includes a total of 40 bits of values, which are used to indicate the third resource in four frames (frames #1 to #4). For example, for frame #1, values of bits corresponding to subframe 0 and subframes 3-9 are 1, and values of bits corresponding to subframes 1 and 2 are 0, that is, in frame #1, a time-frequency resource corresponding to subframes 1 and 2 is the third resource. Similarly, there is no third resource in frame #2. In frame #3, a time-frequency resource corresponding to subframe 2 is the third resource. In frame #4, a time-frequency resource corresponding to subframe 1 is the third resource.

Figure 22:
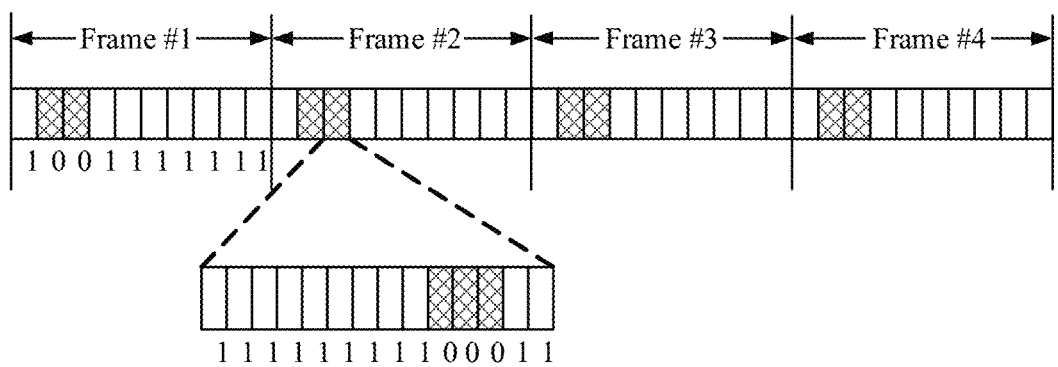
FIG. 22 is a schematic diagram of still another example in which time domain information of a third resource is indicated by a bitmap.

FIG. 22 is a schematic diagram of still another example in which time domain information of a third resource is indicated by a bitmap.

Compared with that in the embodiment shown in FIG. 20, the bitmap in the embodiment shown in FIG. 22 may alternatively be at a symbol level (that is, each bit corresponds to one symbol). In other words, the third resource may alternatively be a resource at a granularity of the symbol level, or be at a subframe level plus the symbol level. In this case, two bitmaps are required. One is used to indicate a specific subframe whose corresponding time-frequency resource includes the third resource. The other is used to indicate a symbol, among 14 symbols of the subframe, whose corresponding time-frequency resource is the third resource. For example, in FIG. 22, a time-frequency resource corresponding to symbols 9, 10, and 11 of subframe 2 in frame #2 is the third resource.

In step 320, the second network device receives the configuration information sent by the first network device.

In step 330, the second network device uses the third resource to transmit data.

Specifically, after receiving the configuration information sent by the first network device, the second network device may determine the third resource based on the configuration information, and transmit data based on the third resource.

For example, the second network device may send or receive data on the third resource.

For another example, the second network device may use the third resource in a grant manner.

For another example, the second network device may use the third resource in a grant-free manner.

For another example, the second network device may use the third resource to communicate with any terminal device served by the second network device.

In this embodiment, the first network device belonging to the first system sends configuration information to the second network device belonging to the second system. The configuration information is used to indicate the third resource, and the third resource is a resource reserved by the first system for the second system, so that the second network device can use the third resource, thereby improving utilization efficiency of resources and avoiding a waste of resources, and further avoiding mutual interference between the two systems.

It should be understood that the foregoing embodiment (that is, the method 300) shown in FIG. 16 and the foregoing embodiment shown in FIG. 2 may be used separately or in combination. This is not limited in this application. For example, when the two embodiments are used in combination, the third resource in the embodiment shown in FIG. 16 may correspond to the second resource in the embodiment shown in FIG. 2, or may correspond to resource #B in the embodiment shown in FIG. 2.

The foregoing describes in detail the communication method 300 in the embodiments of this application with reference to FIG. 15 to FIG. 22. The following describes in detail apparatuses in the embodiments of this application with reference to FIG. 23 to FIG. 25. It should be understood that the apparatuses shown in FIG. 23 to FIG. 25 can implement one or more steps in the method flow shown in FIG. 16. To avoid repetition, details are not described herein again.

Figure 23:
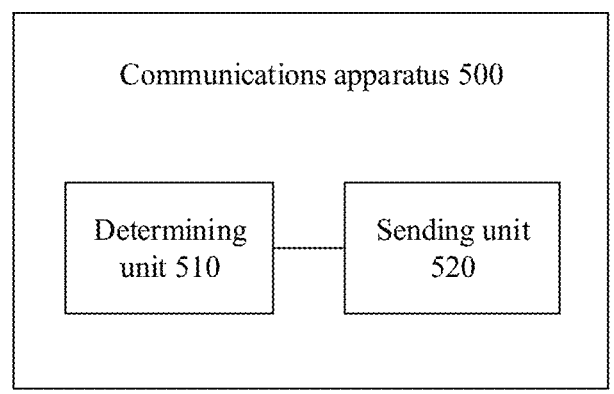
FIG. 23 is a schematic diagram of a communications device according to an embodiment of this application.

FIG. 23 is a schematic diagram of a communications device according to an embodiment of this application. A communications apparatus 500 shown in FIG. 23 includes a determining unit 510 and a sending unit 520.

The determining unit 510 is configured to determine a third resource.

The sending unit 520 is configured to send configuration information to a second network device, where the configuration information is used to indicate the third resource.

The communications apparatus 500 is a network device belonging to a first system, the second network device is a network device belonging to a second system, there is an overlapping part between a frequency domain resource occupied by the first system and a frequency domain resource occupied by the second system, and the third resource is located in the overlapping part and is a resource reserved by the first system for the second system.

Optionally, the first system is a narrowband Internet of things system.

Optionally, the third resource is a resource on an anchor carrier of the narrowband Internet of things system, and the configuration information includes time domain information of the third resource.

Optionally, the third resource is a resource on a non-anchor carrier of the narrowband Internet of things system, and the configuration information includes time domain information and frequency domain information of the third resource.

Optionally, time domain information is indicated by a bitmap.

Figure 24:
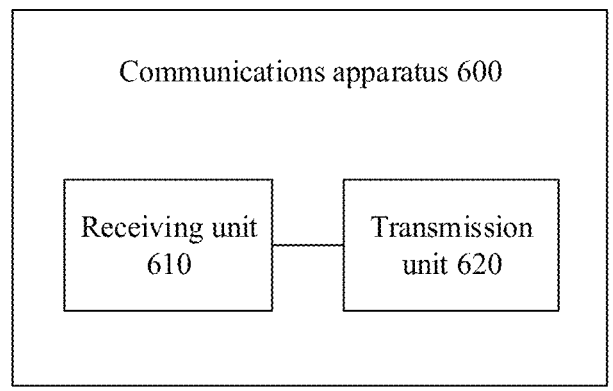
FIG. 24 is a schematic diagram of a communications device according to another embodiment of this application.

FIG. 24 is a schematic diagram of a communications device according to another embodiment of this application. A communications apparatus 600 shown in FIG. 24 includes a receiving unit 610 and a transmission unit 620.

The receiving unit 610 is configured to receive configuration information sent by a first network device, where the configuration information is used to indicate a third resource.

The transmission unit 620 is configured to use the third resource to transmit data.

The first network device is a network device belonging to a first system, the communications apparatus 600 is a network device belonging to a second system, there is an overlapping part between a frequency domain resource occupied by the first system and a frequency domain resource occupied by the second system, and the third resource is located in the overlapping part and is a resource reserved by the first system for the second system.

Optionally, the first system is a narrowband Internet of things system.

Optionally, the third resource is a resource on an anchor carrier of the narrowband Internet of things system, and the configuration information includes time domain information of the third resource.

Optionally, the third resource is a resource on a non-anchor carrier of the narrowband Internet of things system, and the configuration information includes time domain information and frequency domain information of the third resource.

Optionally, time domain information is indicated by a bitmap.

In a possible implementation, the foregoing communications apparatus 500 and communications apparatus 600 may be network devices. The following describes a structure of the network device in the embodiments of this application with reference to FIG. 25.

Figure 25:
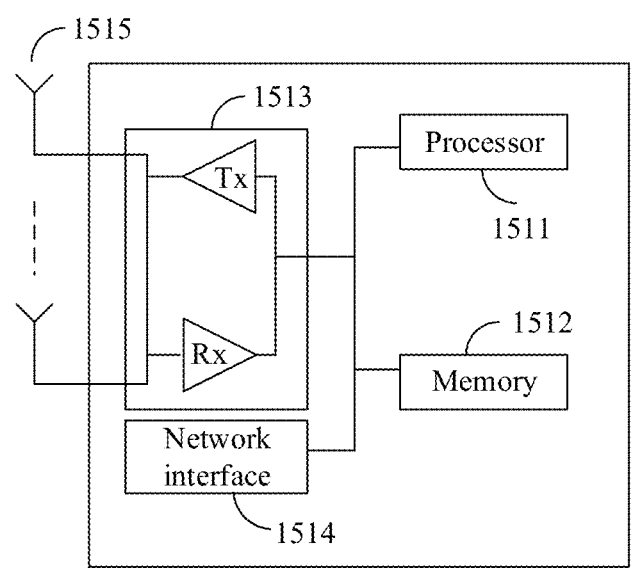
FIG. 25 is a schematic structural diagram of a network device according to an embodiment of this application.

FIG. 25 is a schematic structural diagram of a network device. For the foregoing first network device and second network device, refer to the structure shown in FIG. 25.

The network device includes at least one processor 1511. Optionally, the network device may further include at least one memory 1512, at least one transceiver 1513, at least one network interface 1514, and one or more antennas 1515. The processor 1511, the memory 1512, the transceiver 1513, and the network interface 1514 are connected, for example, by using a bus. The antenna 1515 is connected to the transceiver 1513. The network interface 1514 is configured to connect the network device to another communications device through a communications link. In this embodiment of this application, the connection may include various interfaces, transmission lines or buses, and the like. This is not limited in this embodiment.

The memory 1512 may exist alone, and is connected to the processor 1511. Optionally, the memory 1512 may alternatively be integrated with the processor 1511, for example, integrated into a chip. The memory 1512 can store program code for executing the technical solutions in the embodiments of this application, and the execution is controlled by the processor 1511. Various types of computer program code executed can also be regarded as drivers of the processor 1511. For example, the processor 1511 is configured to execute computer program code stored in the memory 1512, so as to implement the technical solutions in the embodiments of this application.

The transceiver 1513 may be configured to support receiving or sending of radio frequency signals between the network device and the terminal and/or its features, and the transceiver 1513 may be connected to the antenna 1515. The transceiver 1513 includes a transmitter Tx and a receiver Rx. Specifically, one or more antennas 1515 can receive radio frequency signals, and the receiver Rx of the transceiver 1513 is configured to receive the radio frequency signals from the antennas, and convert the radio frequency signals into digital baseband signals or digital intermediate frequency signals, and provide the digital baseband signals or digital intermediate frequency signals to the processor 1511, so that the processor 1511 performs further processing on the digital baseband signals or digital intermediate frequency signals, such as demodulation processing and decoding processing. In addition, the transmitter Tx in the transceiver 1513 is further configured to receive a modulated digital baseband signal or digital intermediate frequency signal from the processor 1511, and convert the modulated digital baseband signal or digital intermediate frequency signal into a radio frequency signal, and send the radio frequency signal through the one or more antennas 1515. Specifically, the receiver Rx can selectively perform one or more stages of down-mixing processing and analog-to-digital conversion processing on the radio frequency signal to obtain a digital baseband signal or a digital intermediate frequency signal. A sequence of the down-mixing processing and the analog-to-digital conversion processing is adjustable. The transmitter Tx can selectively perform one or more stages of up-mixing processing and digital-to-analog conversion processing on the modulated digital baseband signal or digital intermediate frequency signal to obtain a radio frequency signal. A sequence of the up-mixing processing and the digital-to-analog conversion processing is adjustable. The digital baseband signals and the digital intermediate frequency signals may be collectively referred to as digital signals.

It should be understood that, the processor in this embodiment of this application may be a central processing unit (CPU), or may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

According to the method provided in the embodiments of this application, this application further provides a computer program product. The computer program product includes computer program code, and when the computer program code is run on a computer, the computer is enabled to perform the method in FIG. 16.

It should be noted that the foregoing computer program code may be completely or partially stored in a first storage medium, where the first storage medium may be packaged with the processor or packaged separately from the processor. This is not specifically limited in this application.

According to the method provided in the embodiments of this application, this application further provides a chip system, including: a processor, configured to invoke and run a computer program from a memory, so that a communications device on which the chip system is installed performs the method in FIG. 16. Optionally, the chip system includes at least one chip, and may further include another discrete device or circuit structure.

According to the method provided in the embodiments of this application, this application further provides a computer-readable medium. The computer-readable medium stores program code, and when the program code is run on a computer, the computer is enabled to perform the method in FIG. 16.

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method comprising:
   sending, by a network device, downlink control information, wherein the downlink control information is used to schedule a first resource, and the first resource is used to receive or send a first channel;
   receiving, by a communication apparatus, the downlink control information;
   sending, by the network device, first indication information, wherein the first indication information indicates a second resource;
   receiving, by the communication apparatus, the first indication information; and
   in response to the first resource and the second resource overlapping in time domain, receiving or sending, by the communication apparatus or by the network device, the first channel on a third resource, wherein the third resource and the second resource do not overlap in time domain, and wherein the receiving or sending the first channel on the third resource comprises one of the following (a) and (b):
   (a) dropping a part that is of the first channel and that is mapped on the time-domain overlapping part of the first resource and the second resource; and
   (b) postponing receiving or sending a part that is of the first channel and that is mapped on the time-domain overlapping part of the first resource and the second resource.

2. The communication method according to claim 1, wherein the method further comprises: sending, by the network device, second indication information, and wherein the receiving or sending the first channel on the third resource comprises:
   receiving or sending, by the communication apparatus, the first channel on the third resource according to second indication information, wherein the second indication information indicates that in response to the communication apparatus determining that a resource occupied by a channel scheduled by a network device overlapping with the second resource in time domain, the communication apparatus uses a resource that does not overlap with the second resource in time domain to receive or send the channel scheduled by the network device.

3. The communication method according to claim 2, wherein the second indication information is carried in the downlink control information.

4. The communication method according to claim 1, wherein the third resource comprises a part that is of the first resource and that does not overlap with the second resource in time domain.

5. The communication method according to claim 1, wherein the third resource comprises a part that does not overlap with the first resource in time domain.

6. The communication method according to claim 5, wherein a time domain length of the part that is of the third resource and that does not overlap with the first resource in time domain is greater than or equal to a time domain length of a time-domain overlapping part of the first resource and the second resource.

7. The communication method according to claim 1, wherein the first resource is scheduled by a first system, and the second resource is a reserved resource for a second system.

8. The communication method according to claim 7, wherein the first system is a narrowband system, and the second system is a new radio (NR) system.

9. A system comprising: a communications apparatus and a network device,
   wherein the network device comprises a first processor configured to read and execute a first instruction to:
   send downlink control information, wherein the downlink control information is used to schedule a first resource, and the first resource is used to receive or send a first channel;

send first indication information, wherein the first indication information indicates a second resource; and in response to the first resource and the second resource overlapping in time domain, send or receive the first channel on a third resource, wherein the third resource and the second resource do not overlap in time domain;

wherein the communications apparatus comprises a second processor configured to read and execute a second instruction to:

receive the downlink control information;

receive the first indication information; and in response to the first resource and the second resource overlapping in time domain, receive or send the first channel on the third resource, wherein the sending or receiving the first channel on the third resource comprises, one of the following (a) and (b):

(a) dropping a part that is of the first channel and that is mapped on the time-domain overlapping part of the first resource and the second resource; and (b) postponing sending or receiving a part that is of the first channel and that is mapped on the time-domain overlapping part of the first resource and the second resource.

10. The system according to claim 9, wherein the first processor in the communications apparatus is further configured to:

send second indication information; and wherein the receiving or sending the first channel on the third resource comprises:

receiving or sending, by the communication apparatus, the first channel on the third resource according to second indication information, wherein the second indication information indicates that in response to the communication apparatus determining that a resource occupied by a channel scheduled by the network device overlapping with the second resource in time domain, the communication apparatus uses a resource that does not overlap with the second resource in time domain to receive or send the channel scheduled by the network device.

11. The system according to claim 10, wherein the second indication information is carried in one of the following (i) the downlink control information, or (ii) the first indication information.

12. The system according to claim 9, wherein the third resource comprises a part that is of the first resource and that does not overlap with the second resource in time domain.

13. The system according to claim 9, wherein the third resource comprises a part that does not overlap with the first resource in time domain.

14. The system according to claim 13, wherein a time domain length of the part that is of the third resource and that does not overlap with the first resource in time domain is greater than or equal to a time domain length of a time-domain overlapping part of the first resource and the second resource.

15. The system according to claim 9, wherein the first resource is scheduled by a first system, and the second resource is a reserved resource for a second system.

16. The system according to claim 15, wherein the first system is a narrowband system, and the second system is a new radio (NR) system.

17. A computer program product comprising instructions that are stored on a computer-readable medium and that, when executed by one or more processors, cause a network device to:

send downlink control information, wherein the downlink control information is used to schedule a first resource, and the first resource is used to receive or send a first channel;

send first indication information, wherein the first indication information indicates a second resource; and in response to the first resource and the second resource overlapping in time domain, send or receive the first channel on a third resource, wherein the third resource and the second resource do not overlap in time domain, and wherein the sending or receiving the first channel on the third resource comprises one of the following (a) and (b):

(a) dropping a part that is of the first channel and that is mapped on the time-domain overlapping part of the first resource and the second resource; and (b) postponing sending or receiving a part that is of the first channel and that is mapped on the time-domain overlapping part of the first resource and the second resource.

18. The computer program product according to claim 17, wherein the first resource is scheduled by a first system, and the second resource is a reserved resource for a second system.

19. A computer program product comprising instructions that are stored on a computer-readable medium and that, when executed by one or more processors, cause a communication apparatus to:

receive downlink control information, wherein the downlink control information is used to schedule a first resource, and the first resource is used to receive or send a first channel;

receive first indication information, wherein the first indication information indicates a second resource; and in response to the first resource and the second resource overlapping in time domain, receive or send the first channel on a third resource, including one of the following (a) and (b):

(a) dropping a part that is of the first channel and that is mapped on the time-domain overlapping part of the first resource and the second resource (b) postponing receiving or sending a part that is of the first channel and that is mapped on the time-domain overlapping part of the first resource and the second resource.

20. The computer program product according to claim 19, wherein the first resource is scheduled by a first system, and the second resource is a reserved resource for a second system.

* * * * *